United States Patent [19]

Kumagai

[11] 4,167,967

[45] Sep. 18, 1979

[54] AUTOMOBILE AIR-CONDITIONING APPARATUS

[75] Inventor: Naotake Kumagai, Aichi, Japan

[73] Assignee: Mitsubishi Jidosha Kogyo Kabushiki Kaisha, Japan

[21] Appl. No.: 882,085

[22] Filed: Mar. 1, 1978

[30] Foreign Application Priority Data

Mar. 1, 1977 [JP] Japan .............................. 52/23227[U]
Jan. 19, 1978 [JP] Japan .................................... 52/4465

[51] Int. Cl.$^2$ ........................ B60H 1/00; B60Q 11/00; G08B 5/36
[52] U.S. Cl. ................................. 165/11; 73/432 AD; 165/43; 237/12.3 B; 340/52 F; 340/525
[58] Field of Search ............... 165/11, 42, 43; 62/126; 236/94; 340/52 F, 79, 286 M, 524, 525; 73/432 AD; 123/41.15; 237/12.3 B

[56] References Cited

U.S. PATENT DOCUMENTS

| | | | |
|---|---|---|---|
| 3,626,370 | 12/1971 | Stubbs | 340/524 X |
| 3,939,456 | 2/1976 | Curtis | 236/94 X |
| 4,016,534 | 4/1977 | Kobayashi et al. | 340/52 F |
| 4,025,896 | 5/1977 | Hintze et al. | 340/79 X |
| 4,035,764 | 7/1977 | Fujinami et al. | 340/52 F |
| 4,038,061 | 7/1977 | Anderson et al. | 62/126 |
| 4,109,235 | 8/1978 | Bouthors | 340/52 F |

Primary Examiner—Albert W. Davis, Jr.
Assistant Examiner—Margaret A. Focarino
Attorney, Agent, or Firm—Robert E. Burns; Emmanuel J. Lobato; Bruce L. Adams

[57] ABSTRACT

An automobile air-conditioning apparatus, having a display panel on which contours of the automobile body and instrument panel are drawn, that indicates whether or not and in which direction air flows into and out of an air conditioner by indications of letters and arrows illuminated by lamps interlocked with the operation of an air conditioner operating switches mounted on the display panel itself in the positions corresponding to the indications of letters and arrows, so that any driver can easily operate the air conditioner and perceive the positions and directions of the air flow visually at a glance.

34 Claims, 24 Drawing Figures

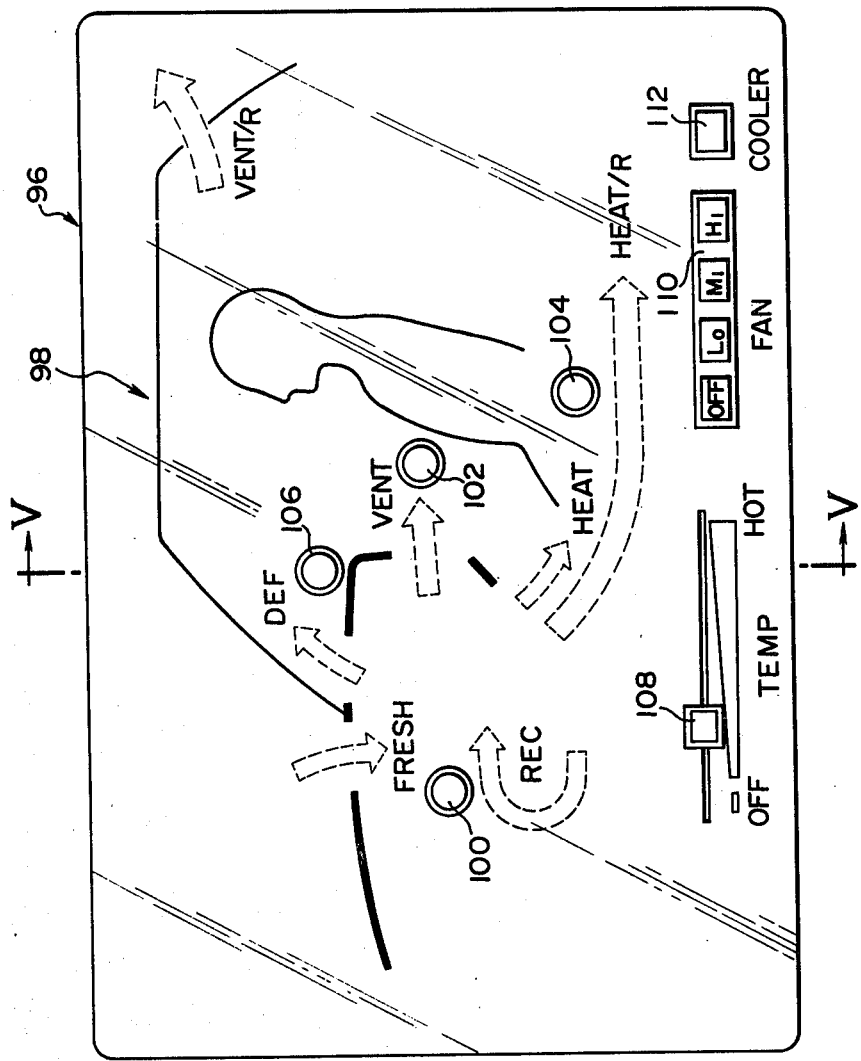

F I G. 20
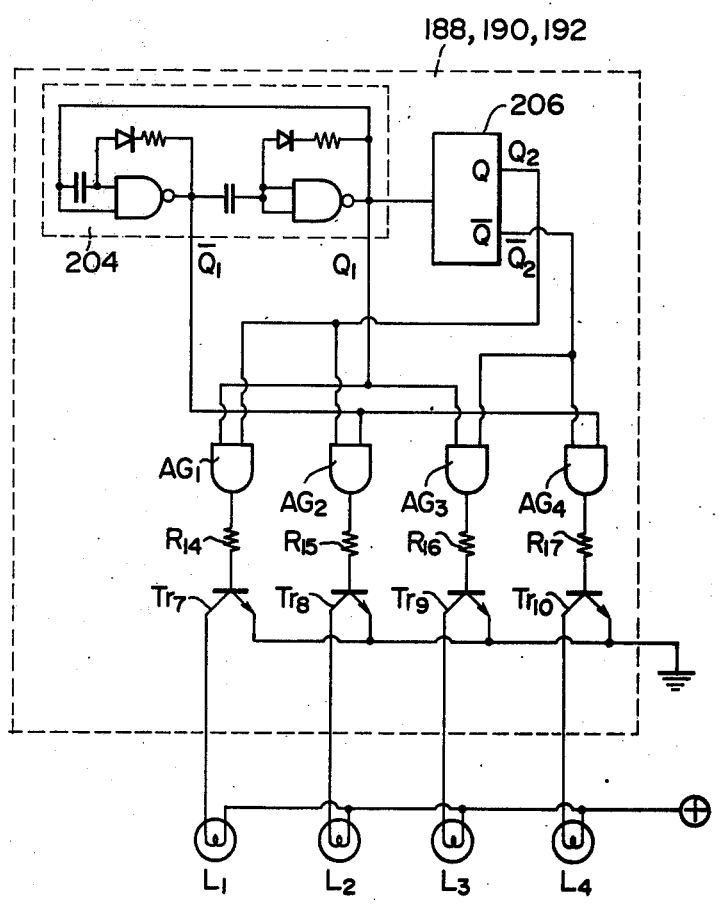

F I G. 23
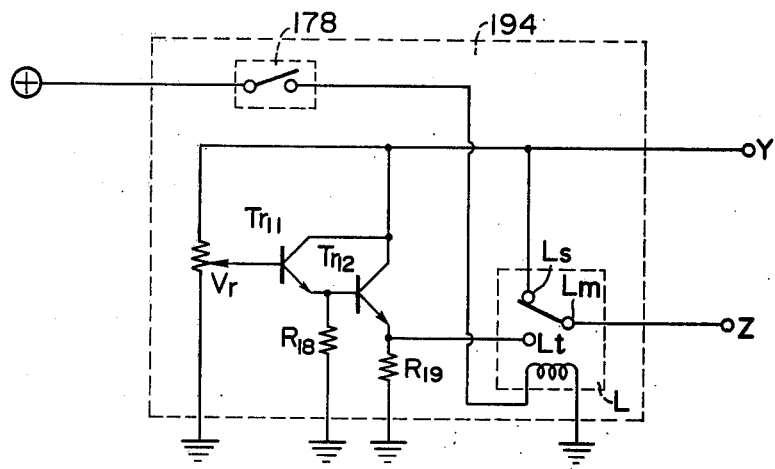
F I G. 24
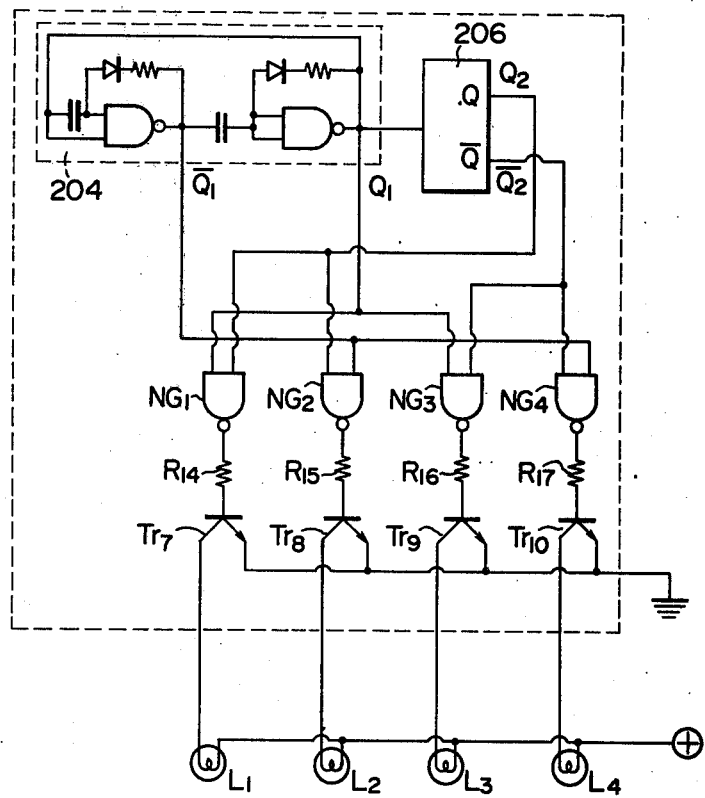

4,167,967

AUTOMOBILE AIR-CONDITIONING APPARATUS

BACKGROUND OF THE INVENTION

This invention relates to means for operating automobile air conditioner and means for indicating whether or not, in what direction, at what temperature, and so on, the air conditioner supplies air with readily perceptible visual indications.

Conventionally, operations of air conditioner have been indicated by means of pilot lamps or letters (ex., such abbreviations as "VENT" and "DEF") provided in individual operating areas. With these indicating means, however, the driver has been unable to effortlessly tell whether or not and at what temperature air is supplied from each port while sitting in the usual driving position. It has been difficult for the abbreviations etc. to show the exact position from which air is supplied. Accordingly, conventional automobile operating manuals have devoted many pages to detailed descriptions of the air conditioner indicating means.

SUMMARY OF THE INVENTION

To eliminate the above-described shortcomings, this invention provides automobile air-conditioning apparatus which comprises an air conditioner proper, comprising, at least, a plurality of air intake and outlet ducts, a plurality of damper valves to open and close said ducts and a fan unit, an operating panel on which the cabin of an automobile carrying said air conditioner proper is sketched, display means disposed in such positions of the sketch that correspond to the positions of said ducts and indicating operating conditions thereof, means for controlling operation of the air conditioner provided in the positions corresponding to said display means on said operating panel, and operating means actuated by said controlling means and operating at least the damper valves in said ducts corresponding thereto. This apparatus displays the operating conditions of the air conditioner with a readily perceptible picture, and permits changing of wind direction and other operating conditions of the air conditioner by the operation of the controlling means disposed on the operating panel with the sketch.

Now some embodiments of this invention will be described by reference to the accompanying drawings.

FIG. 4 is an enlarged view of an operating panel 96.

FIG. 20 is a circuit diagram showing the make-up of sequential circuits 188, 190 and 192 in FIG. 19.

FIG. 23 is a circuit diagram showing the make-up of a light-dimming circuit 194 in FIG. 19.

And FIG. 24 is a circuit diagram showing modifications of the sequential circuits 188, 190 and 192.

Figure 1:
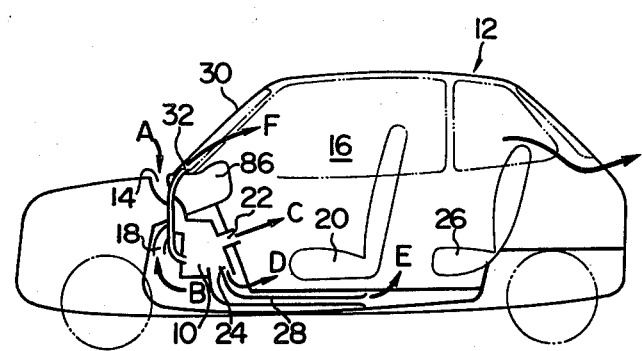
FIG. 1 is a cross-sectional view of an automobile 12 showing where an air conditioner proper 10 of a first embodiment of this invention is provided.
Figure 3:
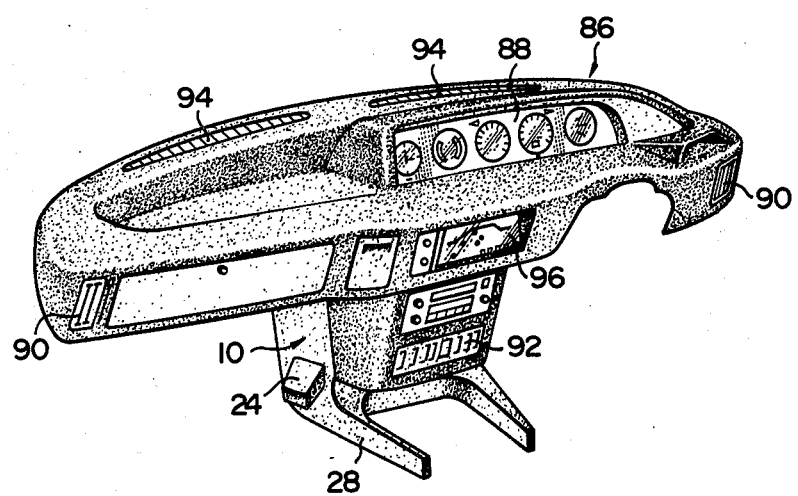
FIG. 3 is a perspective view of an instrument panel 86.
Figure 2:
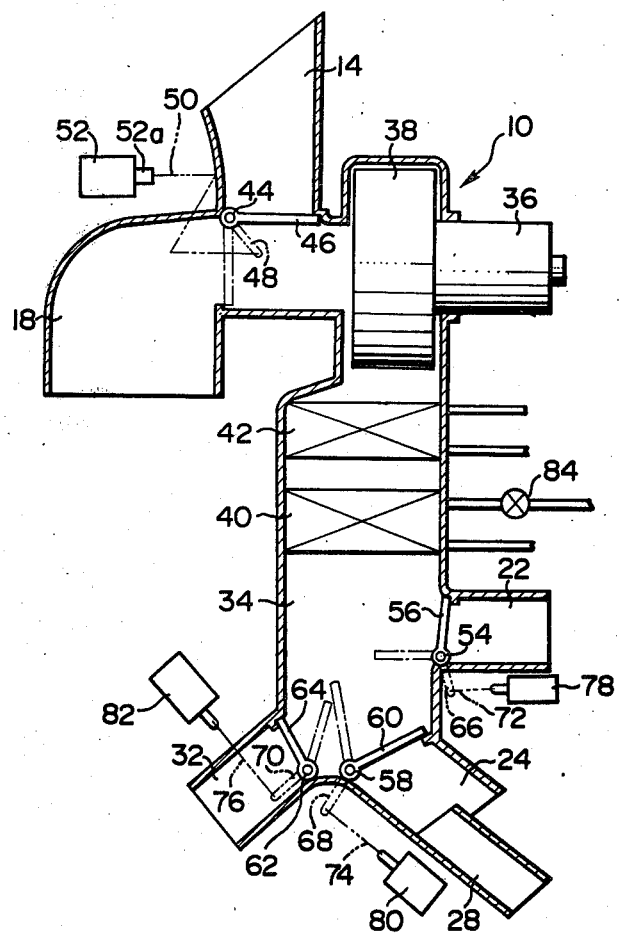
FIG. 2 is a cross-sectional exploded view of the air conditioner proper 10.

In the first embodiment of this invention shown in FIGs. 1 through 13, reference numeral 10 designates an air conditioner proper mounted in an automobile 12, which comprises an external air intake duct 14 that introduces outside air as shown by the arrow A, an internal air intake duct 18 that introduces air in the cabin 16 into the air conditioner proper 10 as shown by the arrow B, a "VENT" outlet duct 22 that supplies air to the upper-half body of the driver and other passenger in the front seat 20 as shown by the arrow C, a "HEAT" outlet duct 24 that supplies air to the feet of said passengers as shown by the arrow D, a "HEAT/R" outlet duct 28 that supplies air to the feet of passengers in the rear seat 26 as shown by the arrow E, a "DEF" outlet duct 32 that supplies air along the inside surface of the front window 30 as shown by the arrow F, and a main duct 34 that connects said intake ducts 14 and 18 with said discharge ducts 22, 24, 28 and 32. The main duct 34 contains a fan 38 driven by a motor 36, a heater core 40, and a cooler core 42. Between said external air intake duct 14 and internal air intake duct 18 is interposed a change-over damper valve 46 that is fixed to a shaft 44 and switchingly opens and closes said intake ducts 14 and 18, rotating about said shaft 44. The change-over damper valve 46 is rotated by a solenoid device 52 through a lever 48 fixed to the extension of the shaft 44 and a link mechanism 50 connected to the end of said lever 48. When the solenoid device 52 is de-energized, a plunger 52a is pushed out by the urging force of a spring not shown, whereby the change-over damper valve 46 is kept in a position to close the external air intake duct 14 and open the internal air intake duct 18, as indicated by solid lines in FIG. 2. When energized, the plunger 52a second withdrawn against the urging force of said spring to keep the change-over damper valve 46 in a position to open the external air intake duct 14 and close the internal air intake duct 18. A "VENT" damper valve 56, fixed to a shaft 54 so as to rotate thereabout, is provided where the "VENT" outlet duct 22 branches from the main duct 34. A "HEAT" damper valve 60, fixed to a shaft 58 so as to rotate thereabout, is provided where the "HEAT" outlet duct 24 branches from the main duct 34. A "DEF" damper valve 64, fixed to a shaft 62 so as to rotate thereabout, is provided where the "DEF" outlet duct 32 branches from the main duct 34. Like said change-over damper valve 46, the damper valves 56, 60 and 64 are rotated by solenoid devices 78, 80 and 82 through levers fixed to the extensions of the shafts 54, 58 and 62 and link mechanisms 72, 74 and 76 connected to the end of said levers 66, 68 and 70, respectively. The solenoid devices 78, 80 and 82 are constructed identically with said solenoid device 52, so that they open the outlet ducts 22, 24 and 32 when energized and closes said outlet duct 22, 24 and 32 when de-energized. The solenoid devices 52, 78, 80 and 82 may be replaced with electric motors so that the damper valves 46, 56, 60 and 64 are operated by way of worm gears and so on. As evident from FIG. 2, the "HEAT/R" outlet duct 28, branched from about a point midway in the "HEAT" outlet duct 24, is opened and closed simultaneously with said "HEAT" outlet duct 24 by the "HEAT" damper valve 60. The temperature of the heater core 40 is controlled by a regulating valve 84 that changes the quantity of hot water supplied thereto. The cooler core 42 is supplied with a refrigerant from a compressor driven by an engine not shown.

Reference numeral 86 denotes an instrument panel disposed in the front portion of the cabin 16, comprising a meter cluster 88 containing several meters, side ventilators 90, an outlet port 92 for the "VENT" outlet duct 22, outlet ports 94 for the "DEF" outlet duct 32, and an operating panel 96 for the air conditioner proper 10. The operating panel 96 is placed approximately in the center of the instrument panel 86 so that the driver and other passengers can readily perceive. On the operating panel 96 is drawn a sketch 98 of the cross-section of the cabin 16, cut along the longitudinal direction of the automobile 10, and the passenger. A change-over push switch 100, which actuates the solenoid device 52 to rotate the change-over damper valve 46, is disposed in such position of the sketch 98 that corresponds to the intake ducts 14 and 18. A "VENT" push switch 102, which actuates the solenoid device 78 to rotate the "VENT" damper valve 56, is disposed in such position of the sketch 98 that corresponds to the "VENT" outlet duct 22. A "HEAT" push switch 104 for the solenoid device 80 is disposed in such position that corresponds to the "HEAT" outlet duct 24 and "HEAT/R" outlet duct 28. And a "DEF" push switch 106 for the solenoid device 82 is disposed in a position corresponding to the "DEF" outlet duct 32. There are provided under the sketch 98 a temperature control lever 108 that actuates the regulating valve 84 of the heater core 40, a fan switch 110 that controls the speed of the fan 38 by regulating the supply of an electric current to the motor 36 in three steps designated by "LO," "MI," and "HI," and a cooler switch 112 that supplies current to a magnetic clutch to connect a compressor for feeding the refrigerant to the cooler core 42 with the engine. The temperature control lever 108 is slidable between letters "OFF" and "HOT," and increases the supply of hot water to the heater core 40 as it slides toward the "HOT" side, thereby increasingly opening the regulating valve 84.

Figure 6:
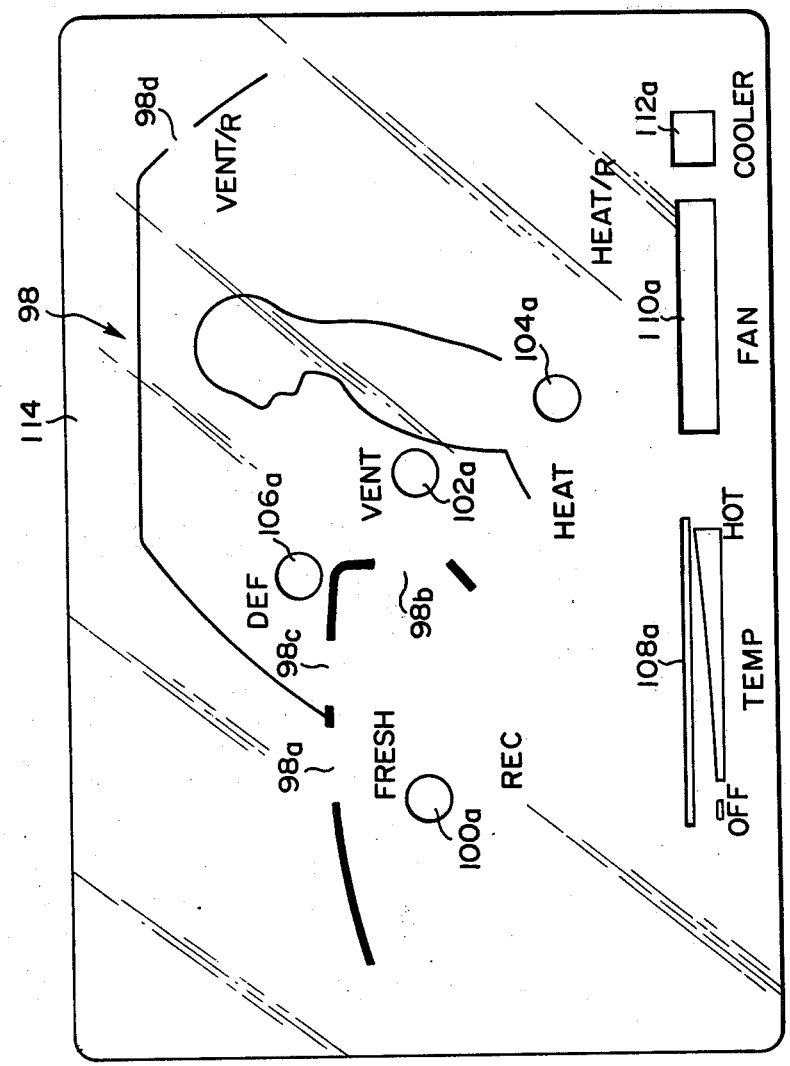
FIG. 6 is an enlarged view of a transparent plate 114 that is a member of the operating panel 96.

The operating panel 96 comprises a transparent plate 114 of glass, acrylic resin or the like, a semitransparent smoked panel 116 of glass, acrylic resin or the like, an opaque shielding plate 118 of metal, plastic or the like, and a back panel 120 that carries lamps and so on, in that order from the surface. The sketch 98 is drawn on the back side of the transparent plate 114 as shown in FIG. 6. A break 98a designating a port introducing air from outside is shown in a position corresponding to the front bonnet, with letters "FRESH" thereunder. Letters "REC" indicating the introduction and recirculation of air inside the cabin are given in a position corresponding to the front portion of the cabin 16. Breaks 98b and 98c are shown in positions corresponding to the "VENT" and "DEF" outlet ports 92 and 94, with letters "VENT" and "DEF" in their vicinity, respectively. Letters "HEAT" and "HEAT/R" are given in positions respectively corresponding to the "HEAT" and "HEAT/R" outlet ducts 24 and 28. A break 98d and letters "VENT/R" indicating the discharge of air from inside to outside are shown in a position corresponding to the rear window. The transparent plate 114 is perforated with holes 100a, 102a, 104a and 106a to fit said push switches 100, 102, 104 and 106, a slit 108a through which said temperature control lever 108 is slid, and holes 110a and 112a for said fan switch 110 and cooler switch 112. Letters "TEMP," "OFF" and "HOT" are written under the slit 108a, and "FAN" and "COOLER" under the holes 110a and 112a, respectively.

Figure 7:
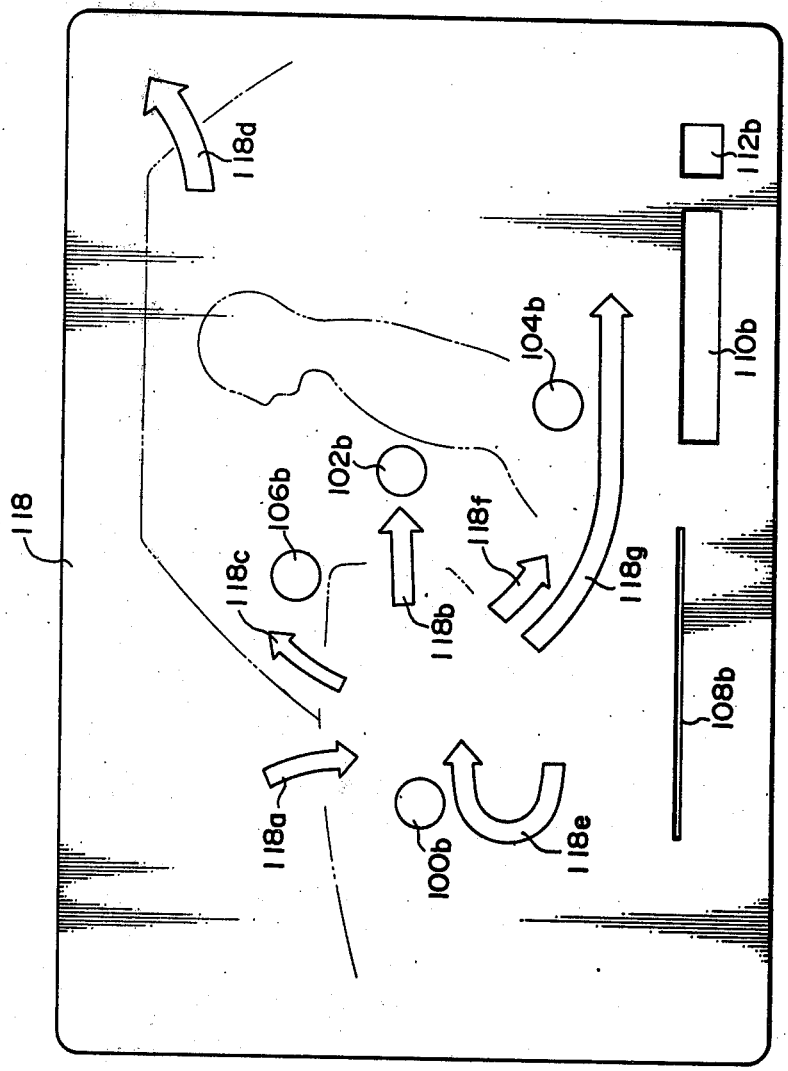
FIG. 7 is an enlarged view of a shielding panel 118 that is also a member of the operating panel 96.

As shown in FIG. 7, the shielding plate 118 has an arrow-shaped opening 118a in a position that overlaps the break 98a in the sketch 98 on the transparent plate 114, an arrow-shaped opening 118b in a position overlapping the break 98b, arrow-shaped openings 118c and 118d in positions overlapping the breaks 98c and 98d, respectively, an arrow-shaped opening 118e in a position in the vicinity of the letters "REC," and arrow-shaped openings 118f and 118g in positions in the vicinity of the letters "HEAT" and "HEAT/R," respectively. Furthermore, holes 100b, 102b, 104b and 106b are perforated in positions corresponding to the push switches 100, 102, 104 and 106, and a slit 108b for the temperature control lever 108 and holes 110b and 112b for the fan switch 110 and cooler switch 112 in the lower portion, respectively.

Figure 5:
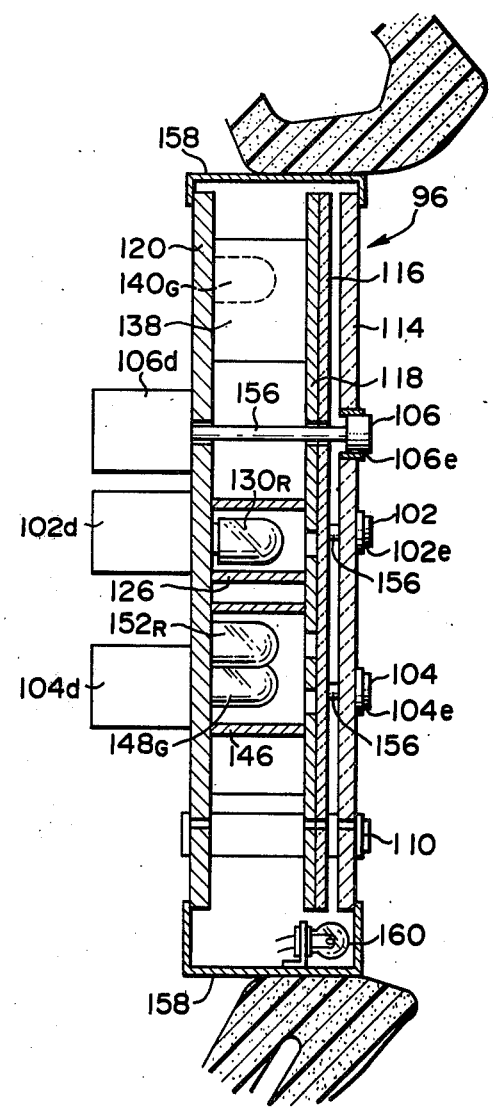
FIG. 5 is a cross-sectional view taken along the line V—V of FIG. 4.
Figure 8:
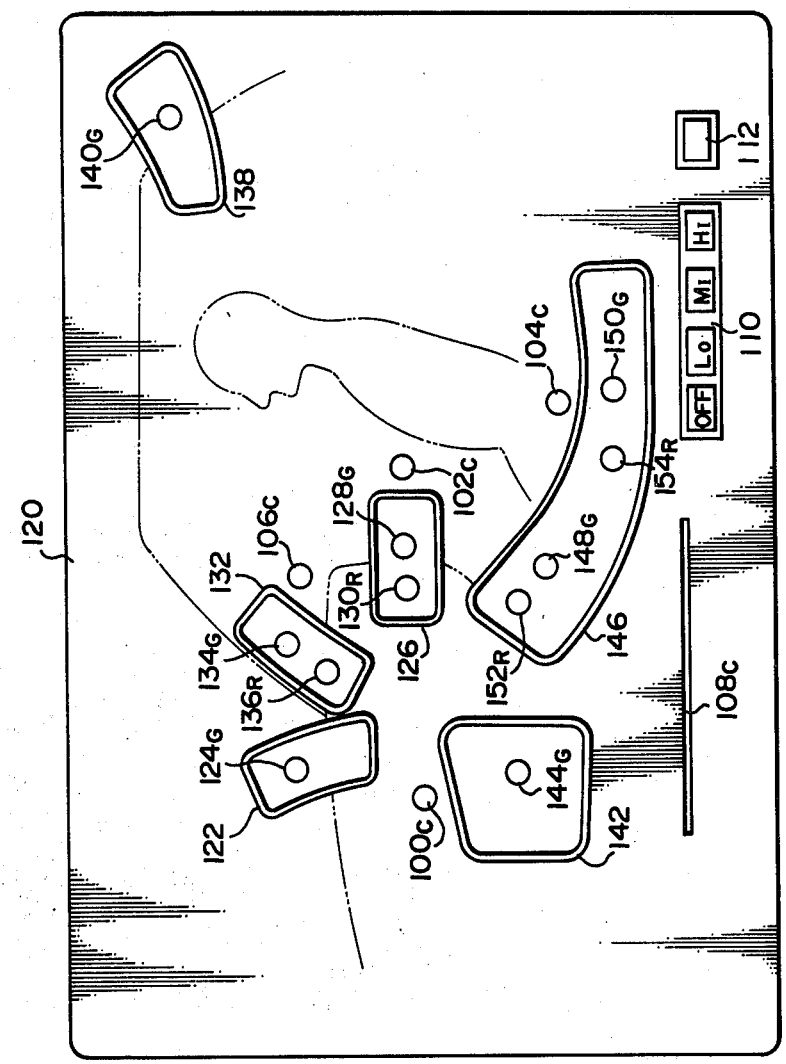
FIG. 8 is an enlarged view of a back panel 120 that is also a member of the operating panel 96.

As shown in FIG. 8, the back plate 120 carries a partition 122 enclosing the opening 118a and a green lamp 124G disposed therein, a partition 126 enclosing the opening 118b and a green and a red lamp 128G and 130R disposed therein, a partition 132 enclosing the opening 118c and a green and a red lamp 134G and 136R disposed therein, a partition 138 enclosing the opening 118d and a green lamp 140G disposed therein, a partition 142 enclosing the opening 118e and a green lamp 144G disposed therein, and a partition 146 collectively enclosing the openings 118f and 118g and green lamps 148G and 150G and red lamps 152R and 154R disposed therein. Holes 100c, 102c, 104c and 106c are perforated in positions corresponding to the push switches 100, 102, 104 and 106, respectively, and a slit 108c for the temperature control lever 108 in the lower portion, with the fan and cooler switches proper 110 and 112 attached at one side thereof. The push switches 100, 102, 104 and 106 comprise main portions 100d, 102d, 104d and 106d which was fixed to the rear side of the back plate 120 and connected to operating portions 100e, 102e, 104e and 106e, protruding byeond the transparent plate 114, by rods 156, as shown in FIG. 5. (In FIG. 5, the main and operating portions 100d and 100e of the push switch 100 are not shown).

The above-described transparent panel 114, smoked panel 116, shielding plate 118 and back plate 120 are arranged as shown in FIG. 5; i.e., the transparent and back plates 114 and 120 are fastened by a frame 158, and the smoked panel 116 and shielding plate 118, after being stuck together with a bonding agent etc., are fixed to the surface-side end of said partitions. There is provided a lamp 160, which is turned on and off by an illumination lamp switch of the automobile 12, in the vicinity of or in contact with an edge of the transparent plate 114 so that the transparent plate 114 (the operating panel 96) may be illuminated by the lamp 160 at night. Being thus constructed, closing one push switch opens or switches a corresponding damper valve and turns on a light corresponding to a duct opened thereby. At this time, the driver feels as if an arrow on the operating panel 96 shines, by the function of the shielding plate 118. Further, if the fan switch 110 is in any other position than "OFF" in this condition, it can be easily confirmed that air is flowing into or out of a duct corresponding to the illuminated arrow. Accordingly, the above-described arrangement makes up means for displaying the operating conditions of the individual ducts. The opened push switches 100, 102, 104 and 106 are closed by one push, and then re-opened by another push.

Circuits showing electric wiring for the lamps disposed on the back plate 120 of the operating panel 96, push switches and damper valves will be described hereunder.

Movable contacts 102m, 104m and 106m of the push switches 102, 104 and 106 are connected to the positive terminal of a battery not shown, through a car-speed detecting device 162. Movable contacts 110m and 110n of the fan switch 110, which is a double-throw switch, connect to said positive battery terminal. The stationary contact for one movable contact 110m of the fan switch 110 offers three positions "LO," "MI," and "HI" for selection. The "LO" contact connects through a resistor with the motor 36 that drives the fan 38, the "MI" contact, through a resistor having lower resistance, with the motor 36, and the "HI" contact direct with the motor 36 without interposing a resistor therebetween. The other traveling contact 110n also has three positions "LO," "MI," and "HI" for selection. These three contacts are connected with each other, and then to between the car-speed detecting switch 162 and the switches 102, 104 and 106, via a diode 164.

To a stationary contact 102s of the "VENT" push switch 102 are connected the solenoid device 78 and one end each of the lamps 128G and 130R. To a stationary contact 140s of the "HEAT" push switch are connected the solenoid device 80 and one end each of the lamps 148G, 150G, 152R and 154R. To a stationary contact 106s of the "DEF" push switch 106 are connected the solenoid device 82 and the lamps 134G and 136R. The change-over push switch 100 is a two-throw push switch having two movable contacts 100m and 100n. Like said push switches 102, 104 and 106, one movable contact 100m connects through said car-speed detecting switch 162 with the positive terminal of the battery. A stationary contact 100s corresponding to said movable contact 100m connects with the solenoid device 52 and one end each of the lamps 124G and 140G. The other movable contact 100n connects direct with a stationary contact corresponding to the movable contact 110n of said fan switch 110. A stationary contact 100t corresponding to the movable contact 100n connects with one end of the lamp 144G. When the movable contact 100m of the change-over switch 100 connects with the stationary contact 100s, the movable contact 100n disconnects with said contact 100t, whereas when the movable contact 100m disconnects with said contact 100s, the movable contact 100n connects with the stationary contact 100t.

A "HEAT" switch 166, which detects the motion of the temperature control lever 108 on the operating panel 96 and operates accordingly, is a change-over switch with one movable contact 166m and two stationary contacts 166s and 166t. The movable contact 166m connects with the stationary contact 166s when the temperature control lever 108 is in "OFF" position and with the stationary contact 166t when the temperature control lever 108 is in any other position than "OFF." Furthermore, the movable contact 166m connects with the X terminal of a flicker circuit 168 to be described later. Said green lamps 128G, 134G, and 148G and 150G connect through diodes D1, D2 and D3, respectively, with the stationary contact 166s, while said red lamps 130R, 136R, and 152R and 154R connect through diodes D4, D5 and D6, respectively, with the stationary contact 166t. Said green lamps 124G nd 140G connect throught a diode D7, and the green lamp 144G through a diode D8, with the X terminal of said flicker circuit 168. A cooler operation detecting switch 170, which is interlocked with the cooler switch 112 on the operating panel 96 so as to close when the cooler switch 112 closes, has a stationary terminal 170s that connects with said green lamps 128G, 134G, 148G and 150G and a movable terminal 170m that connects with said X terminal of the flicker circuit 168.

Figure 10:
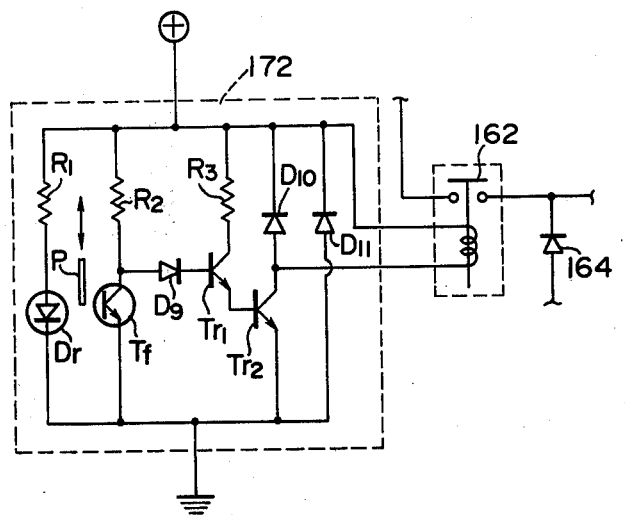
FIG. 10 is a circuit diagram of a car-speed detecting device 172 in FIG. 9.

Now the car-speed detecting switch 162 will be explained by reference to FIG. 10. The car-speed detecting switch 162 is a relay that is opened and closed by a car-speed detecting device 172. The car-speed detecting device 172 is a known assembly comprising a light-emitting diode Dr, a phototransistor f, diodes D9 through D11, transistors Tr1 and Tr2, resistors R1 through R3, and a rotating plate P. When the automobile is at a standstill or running at a very low speed, such as at 10 km per hour, the rotating plate P interlocked with the speed-meter indicator does not come into between the light-emitting diode Dr and the phototransistor Tf, thus permitting infrared rays from the light-emitting diode DR to reach the phototransistor Tf. Thereupon, internal resistance of the phototransistor Tf becomes much lower than that of the resistor R2, which extremely reduces voltage applied on the diode D9 and therefore does not put the transistors Tr1 and Tr2 in operation. Consequently, the car-speed detecting switch 162 remains open, with an exciting coil thereof not energized. When the car speed exceeds 10 km per hour, the rotating plate P interlocked with the speedmeter indicator comes into between the light-emitting diode Dr and phototransistor Tf to prevent the infrared rays from the light-emitting diode Dr from reaching the phototransistor Tf, which makes the internal resistance of the phototransistor Tf substantially equal to that of the resistor R2 and applies large voltage on the diode D9. Consequently, the transistors Tr1 and Tr2 conduct, the exciting coil of the car-speed detecting switch 6 becomes energized, and the car-speed detecting switch 162 closes.

Figure 11:
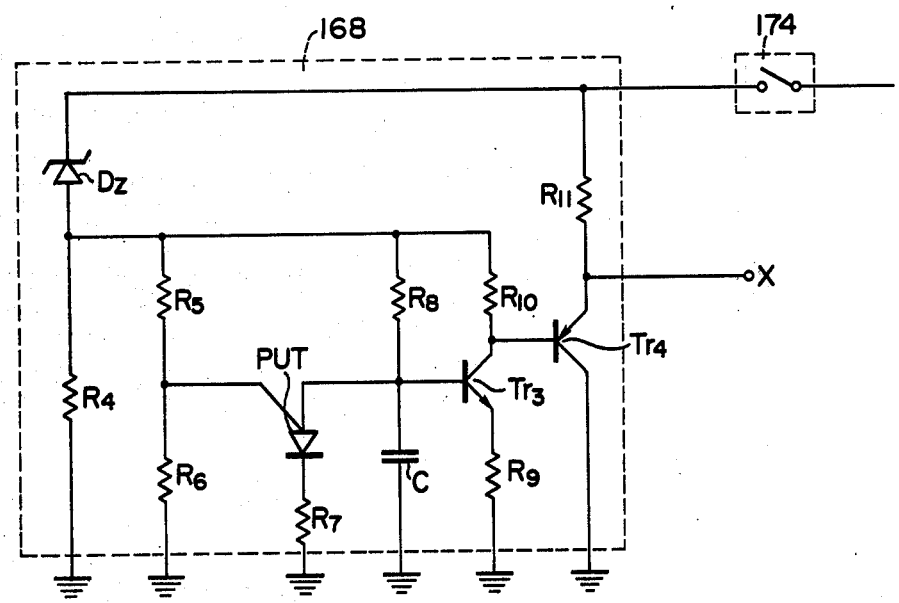
FIG. 11 is a circuit diagram showing the make-up of a flicker circuit 168 in FIG. 9.
Figure 12:
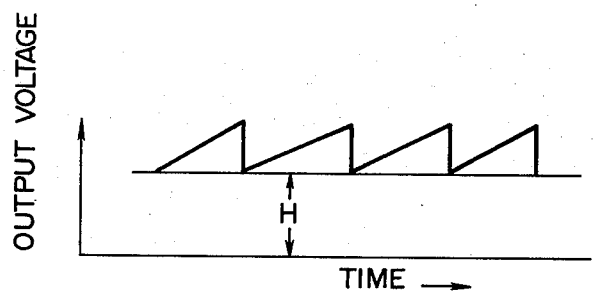
FIG. 12 is a graphical representation of time-wise changes in voltage at a terminal X of the flicker circuit 168.
Figure 13:
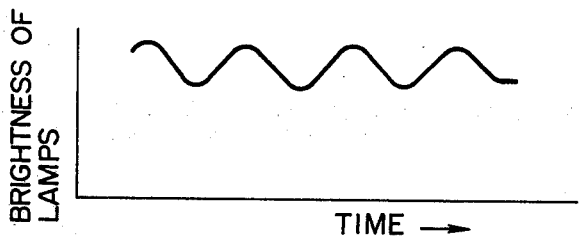
FIG. 13 is a graphical representation of changes in lamp brightness.

The following is a description of the flicker circuit 168 by reference to FIG. 11. The flicker circuit 168 comprises a programmable unijunction transistor PUT, resistors R4 through R11, transistors Tr3 and Tr4, a capacitor C and a Zener diode DZ. On changing the electric potential at the X terminal by inverting the output voltage generated by an oscillating circuit comprising said programmable unijunction transistor PUT, resistors R5 through R8 and capacitor C, as shown in FIG. 12, by the transistor Tr3 and amplifying by the transistor Tr4, brightness of the lamps connected to said X terminal changes as shown in FIG. 13. The resistor R4 and Zener diode DZ perform a function to apply a D.C. bias, designated by H in FIG. 12, to the output voltage of the oscillating circuit, so that the lamps are able to vary their brightness without going off. The flicker circuit 168 connects through an ignition key switch 174 with the battery.

Now the following paragraphs describe the operation of the above-described embodiment.

On turning the temperature control lever 108 on the operating panel 96, in conjunction with the fan switch 110, cooler switch 112 and push switches 102, 104 and 106, to OFF position and bringing the movable contact 100m of the change-over push switch 100 into contact with the stationary contact 100s, the motor 36 is not driven, the movable contact 166m of the "HEAT" switch 166 connects with the stationary contact 166s, and the cooler operation detecting switch 170 turns off. When the automobile is running at a speed not exceeding 10 km per hour in this state, no current is supplied to the circuit shown in FIG. 9 as the car-speed detecting switch 162 is open. Consequently, the lamps do not light, the "VENT" damper valve 56, "HEAT" damper valve 60 and "DEF" damper valve 64 close their ducts 22, 24 and 32, respectively, and the change-over damper valve 46 closes the external air intake duct 14. When the car speed increases from this state to above 10 km per hour, the car-speed detecting switch 162 closes to supply current to the solenoid device 52, the change-over valve 46 turns to open the external air intake duct 14, and the green lamps 124G and 140G light. Accordingly, the driver sees green light on the operating panel 96, passing through the arrow-shaped openings 118a and 118d in the shielding plate 118 and, thereby, notices that external air is introduced from outside into the air conditioner proper 10. At this time, the external air does not flow into the cabin 16, because the other push switches 102, 104 and 106 are not closed and, therefore, the damper valves 56, 60 and 64 are not open. When any one of said push switches 102, 104 and 106, for example, the "VENT" push switch 102, is closed, the "VENT" damper valve 56 becomes opened and the external air flows from the "VENT" outlet port 92 into the cabin 16. At the same time, the green lamp 128G lights, so that the driver sees green light from said lamp 128G on the operating panel 96, passing through the arrow-shaped opening 118b in the shielding plate 118 and, thereby, notices that the low-temperature external air is flowing into the cabin 16 from the "VENT" outlet port 92.

When the fan switch 110 is turned to any of "LO," "MI," and "HI" positions in the above-described state, the green lamps 124G and 140G always light irrespective of car-speed, and the external air intake duct 14 becomes opened. When any of the push switches 102, 104 and 106, for example, the "DEF" push switch 106 is closed in this condition, the "DEF" damper valve 64 becomes opened and the external air flows from the "DEF" outlet port 94 along the inside surface of the front window 30 into the cabin 16. At the same time, the green lamp 134G lights, so that the driver sees green light from said lamp 134G on the operating panel 96, passing through the arrow-shaped opening 118c in the shielding plate 118, and, thereby, notices that the low-temperature external air is flowing form the "DEF" outlet port 94. Even when the cooler switch 112 is closed in this state, the same lamp turns on.

When the temperature control lever 108 is slid to any other positions than "OFF" while closing the fan switch 110, hot water is supplied to the heater core 40 and the "HEAT" switch 166 is switched so that the movable contact 116m connects with the stationary contact 166t. Accordingly, when any of said push switches 102, 104 and 106, for example, the "HEAT" push switch 104, is closed, the "HEAT" damper valve 60 becomes opened and the external air heated by said heater core 40 is forcibly fed from the "HEAT" outlet duct 24 and "HEAT/R" outlet duct 28 into the cabin 16 by the action of said fan 38. At the same time, the red lamps 152R and 154R light, and the driver sees red light from said lamps 152R and 154R on the operating panel 96, passing through the arrow-shaped openings 118f and 118g in the shielding plate 118, and, thereby, notices that the heated external air is flowing from said "HEAT" and "HEAT/R" outlet ducts 24 and 28 into the cabin 16.

When the cooler switch 112 is closed while keeping the temperature control lever 108 in any other positions than "OFF," the cooler operation detecting switch 170 becomes closed. When, therefore, any of the push switches 102, 104 and 106, for example, the "VENT" push switch 102, is closed, the red lamp 130R and the green lamp 128G both light. As a consequence, the driver sees yellow light, produced by the mixing of the red and green lights from said lamps 128G and 130R, passing through the arrow-shaped opening 118b in the shielding plate 118, and, thereby, notices that the medium-temperature fresh air, cooled by the cooler core 42 and then heated by the heater core 40, is flowing from the "VENT" outlet port 92 into the cabin 16.

On turning the change-over push switch 100 so that the movable contact 100n connects with the stationary contact 100t, the solenoid device 52 becomes de-energized, the change-over damper valve 46 closes the external air intake duct 14 and opens the foul-air intake duct 18. If the fan switch 110 is in "OFF" position at this time, the green lamp 144G does not light irrespective of car-speed. But when any of the other push switches 102, 104 and 106 is closed, a lamp connecting with the switch closed lights as the car-speed exceeds km per hour and closes the fan switch 110, thus indicating that air is flowing from the outlet duct corresponding to the lit lamp. For example, when the "VENT" push switch 102 is closed, closing the fan switch 110 turns on the green lamp 144G by the action of the change-over push switch 100 and discharges air from the "VENT" outlet port 92. At this time, the green lamp 128G lights when the temperature control lever 108 is in "OFF" position, the red lamp 130R when the lever 108 is in other position than "OFF," and both the red and green lamps 128G and 130R when the lever 108 is in other position than "OFF" and the cooler switch 110 is closed.

The lamps lighting in the above-described conditions, and therefore the arrow-shaped indications on the operating panel 96, become repeatedly bright and dark by the action of said flicker circuit. As the push switches 102, 104 and 106 can be opened and closed individually, the push switches 102, 104 and 106 are capable of opening or closing all of the corresponding damper valves 56, 60 and 64 at a time. When all are opened, all corresponding lamps light.

As evident from the above, air intake and discharge conditions of the air conditioner proper 10 of the automobile are indicated on the operating panel 96, with different colors for different temperatures of the air discharged. The indications are colored green when the heater is not used or only the cooler is used, and red when only the heater is used, and yellow when both heater and cooler are used. Accordingly, the driver can perceive the operating condition of the air conditioner proper 10 with great ease. Furthermore, any person not fully acquainted with the operation of the air conditioner proper 10 can let air flow from the desired position by simply pushing a push switch in the corresponding position in the sketch 98 on the operating panel 96. All this makes the operation of the air conditioner proper 10 very easy and convenient. Provision of the indicating lamps behind the smoked panel 116 insures good perceptibility, because the arrow-shaped openings are not visible to the driver when the lamps are off, but they become visible only when and where the lamps or lamp lights.

The green and red lamps used in the above-described embodiment may be replaced with any combination of colors suited for discriminating hot air from cold air, for example, orange and blue. Also, the lamps may be replaced with self-light-emitting elements, liquid crystals, and the like. The car-speed detecting switch 162, adapted to close when the car speed exceeds 10 km per hour, may be designed so as to remain open while the car is stopping and closes as soon as it starts to run. Or, any other appropriate speed than 10 km per hour may be selected as the point at which the switch 162 opens and closes while the car is running. The "HEAT" switch 166 in the above embodiment is so designed that the contacts 166*m* and 166*s* come in contact with each other when the temperature control lever 108 is in "OFF" position, and the contacts 166*m* and 166*t* in other positions than "OFF." The movable contact 166*m* may also be fully interlocked with the temperature control lever 108 so that the movable contact 166*m* contacts a slide resistor connected to the stationary contact 166*t* when the lever 108 is in any position other than "OFF" and the resistance of said slide resistor decreases as the temperature control lever 108 approaches "HOT" position. Then the red lamps become gradually brighter as the temperature control lever 108 approaches "HOT" position, thereby giving clearer temperature-wise indications of the air discharged.

Figure 14:
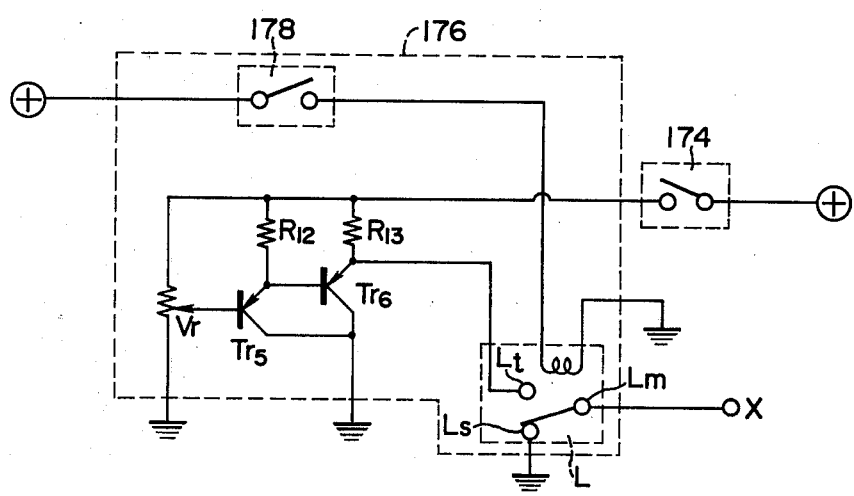
FIG. 14 is a circuit diagram showing the make-up of a light-dimming circuit 176.

The flicker circuit 168 may be replaced with a light-dimming circuit 176 indicated in FIG. 14. The light-dimming circuit 176 comprises a variable resistor Vr, resistors R12 and R13, transistors Tr5 and Tr6, a relay L, and a switch 178 for the illumination lamps of the automobile 12. When the illumination lamp switch 178 is opened, a movable contact Lm of the relay L connects with a stationary contact Ls to make the X terminal grounded and light the lamps bright. When the illumination lamp switch 178 is closed, the movable contact Lm connects with the stationary contact Lt, and the contact Lt becomes grounded through the power transistors Tr5 and Tr6 to reduce the brightness of the lamps. This assures safety driving during the night by preventing the lamps from shining too bright. The light-dimming circuit connects via the ignition key switch 174 with the battery. The flicker circuit 168 and light-dimming circuit 176, of course, may be used in combination.

Figure 9:
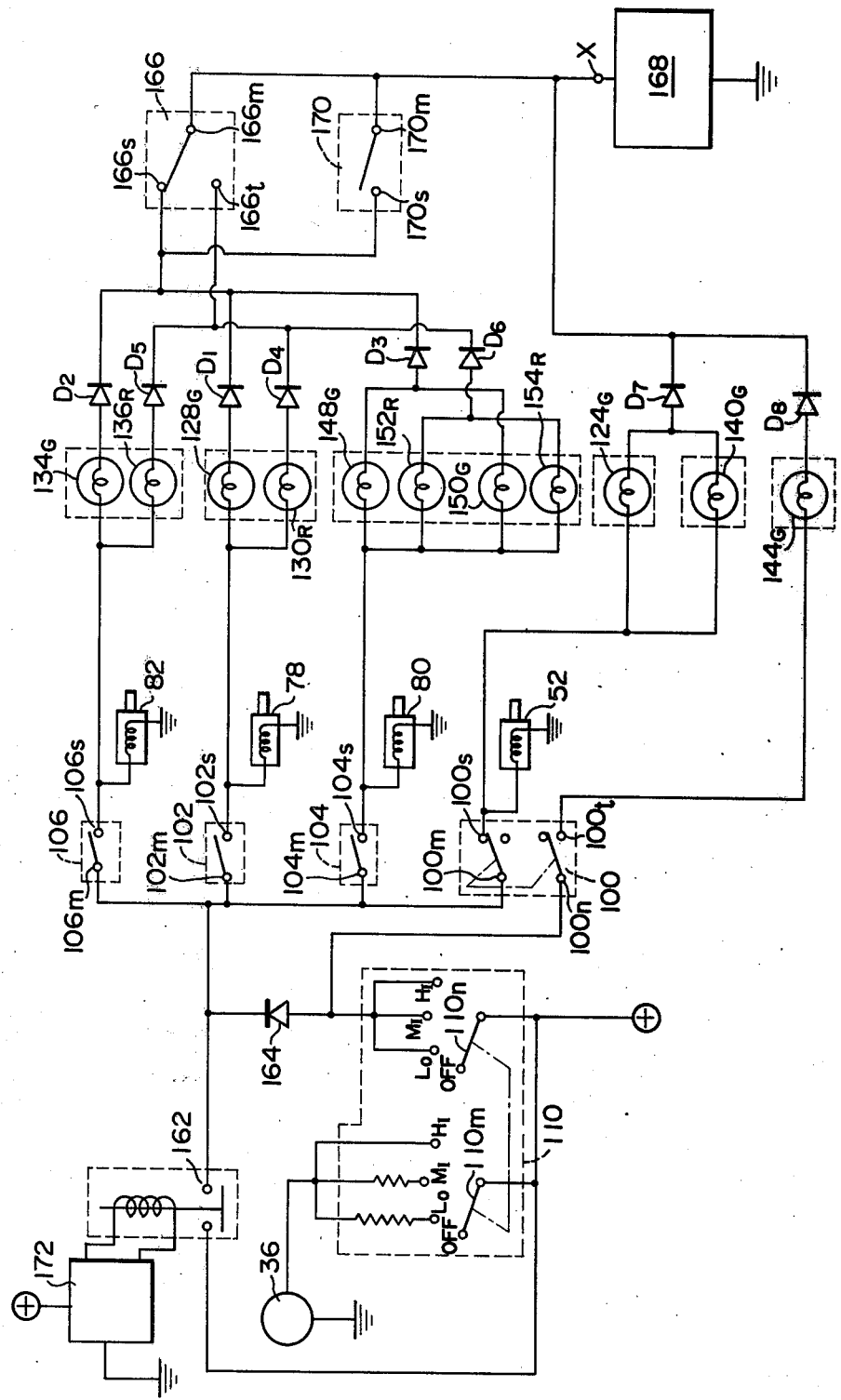
FIG. 9 is a circuit diagram showing the electrical make-up of the first embodiment.
Figure 15:
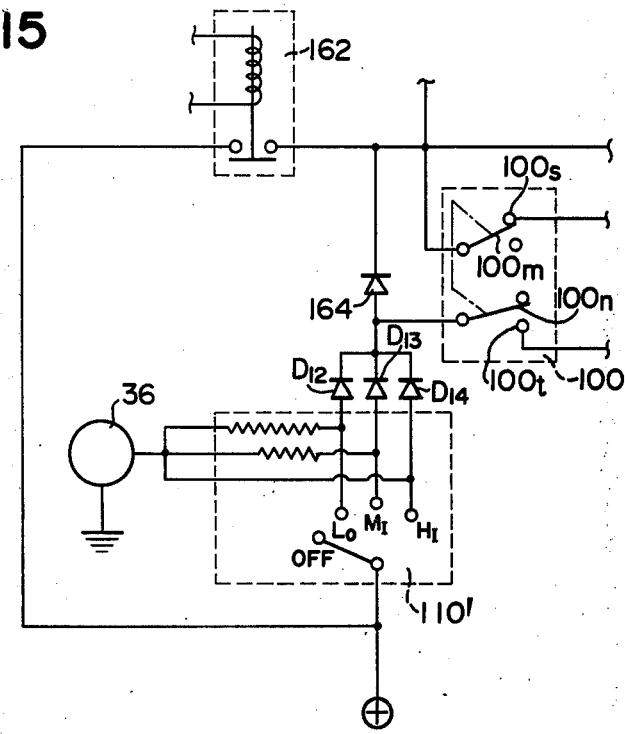
FIG. 15 is a circuit diagram showing the principal portion of a modification of the first embodiment.

The fan switch 110 in the above embodiment is a two-throw switch. This fan switch may be replaced with a single switch 110', as shown in FIG. 15, whose fixed contacts are connected to the diode 164 shown in FIG. 9 via diodes D12 through D14. This assembly functions in the same way as the one whose circuit is shown in FIG. 9.

Next, a second embodiment of this invention will be described by reference to FIG. 16. Similar reference numerals designate such parts as are similar to those in the above-described first embodiment, and their description will be omitted. This embodiment has an air conditioner proper 10 and operating panel 96 of the same construction as those of the first embodiment, but the lighting circuit of the lamps disposed on a back plate 120 of the operating panel 96 is modified to some degree. Namely, the car-speed detecting switch 162 of the first embodiment is eliminated and the lamps are connected through the ignition key switch 174. The movable contacts of the push switches 102, 104 and 106 connect with the ignition terminal IG of said ignition key switch 174. The change-over push switch is not of two-throw type as shown in FIG. 9, but a single push switch 100'. A movable contact 100'*m* thereof connects with the ignition terminal IG, with one stationary contact 100'*s* connecting with the solenoid device 52 and the green lamps 124G and 140G and the other stationary contact 100'*t* with the green lamp 144G. A fan switch 110" has a movable contact 110"*m* connecting with said ignition terminal IG and stationary contacts "LO," "MI" and "HI," disposed opposite to the movable contact 110"*m*, connecting with the motor 36 through a resistor, a resistor introducing less resistance than the preceding one does, and no resistor, respectively. Furthermore, said ignition key switch 174 is of known construction, having an accessory terminal ACC and a starter terminal ST, in addition to said ignition terminal IG.

In the above-described arrangement, the damper valves of the air conditioner proper 10 do not operate, nor will the lamps light, when the ignition key switch 174 is not connected with the ignition terminal IG. When the ignition key switch 174 connects with the ignition terminal IG, a damper valve that corresponds to a closed one among the push switches 100', 102, 104 and 106 opens and a lamp connected with the closed switch lights, irrespective of whether or not the fan switch 100" is open and of car speed. Table 1 shows the relationship between the opening condition of the push switches 100', 102, 104 and 106 and the lighting condition of the lamps 128G through 154R. In Table 1, a blank column indicates that no lamp is on, "G" indicates that a green lamp is on, "R" indicates that a red lamp is on, and "G·R" indicates that both green and red lamps are on to produce a yellow light on the operating panel 96.

TABLE 1

| position of the cooler operation detecting switch 170 | lamp(s) | position of the tempera-ture control lever 108 | position of the change-over push switch 100' — REC (the movable contact 100'm connects with the contact 100't) | | | | | | | | | | | | | |
|---|---|---|---|---|---|---|---|---|---|---|---|---|---|---|---|---|
| | | | push switch(es) to be closed | DEF106 | | DEF106 VENT102 | | DEF106 HEAT104 | | VENT102 | | VENT102 HEAT104 | | HEAT104 | | DEF106 VENT102 HEAT104 | |
| | | | OFF | NOT OFF | OFF | NOT OFF | OFF | NOT OFF | OFF | NOT OFF | OFF | NOT OFF | OFF | NOT OFF | OFF | NOT OFF |
| OFF (the cooler switch 112 is OFF) | 134G, 136R | (DEF) | G | R | G | R | G | R | | | | | | | G | R |
| | 128G, 130R | (VENT) | | | G | R | | | G | R | G | R | | | G | R |
| | 148G, 152R | (HEAT) | | | | | G | R | | | G | R | G | R | G | R |
| | 150G, 154R | (HEAT/R) | | | | | G | R | | | G | R | G | R | G | R |
| | 140G | (VENT/R) | | | | | | | | | | | | | | |
| | 124G | (FRESH) | | | | | | | | | | | | | | |
| | 144G | (REC) | G | G | G | G | G | G | G | G | G | G | G | G | G | G |
| ON (the cooler switch 112 is ON) | 134G, 136R | (DEF) | G | G.R | G | G.R | G | G.R | | | | | | | G | G.R |
| | 128G, 130R | (VENT) | | | G | G.R | | | G | G.R | G | G.R | | | G | G.R |
| | 148G, 152R | (HEAT) | | | | | G | G.R | | | G | G.R | G | G.R | G | G.R |
| | 150G, 154R | (HEAT/R) | | | | | G | G.R | | | G | G.R | G | G.R | G | G.R |
| | 140G | (VENT/R) | | | | | | | | | | | | | | |
| | 124G | (FRESH) | | | | | | | | | | | | | | |
| | 144G | (REC) | G | G | G | G | G | G | G | G | G | G | G | G | G | G |

| position of the cooler operation detecting switch 170 | lamp(s) | position of the tempera-ture control lever 108 | positon of the change-over push switch 100' — FRESH (the movable contact 100'm connects with the contact 100's) | | | | | | | | | | | | | |
|---|---|---|---|---|---|---|---|---|---|---|---|---|---|---|---|---|
| | | | push switch(es) to be closed | DEF106 | | DEF106 VENT102 | | DEF106 HEAT104 | | VENT102 | | VENT102 HEAT104 | | HEAT104 | | DEF106 VENT102 HEAT104 | |
| | | | OFF | NOT OFF | OFF | NOT OFF | OFF | NOT OFF | OFF | NOT OFF | OFF | NOT OFF | OFF | NOT OFF | OFF | NOT OFF |
| OFF (the cooler switch 112 is OFF) | 134G, 136R | (DEF) | G | R | G | R | G | R | | | | | | | G | R |
| | 128G, 130R | (VENT) | | | G | R | | | G | R | G | R | | | G | R |
| | 148G, 152R | (HEAT) | | | | | G | R | | | G | R | G | R | G | R |
| | 150G, 154R | (HEAT/R) | | | | | G | R | | | G | R | G | R | G | R |
| | 140G | (VENT/R) | G | G | G | G | G | G | G | G | G | G | G | G | G | G |
| | 124G | (FRESH) | G | G | G | G | G | G | G | G | G | G G | G | G | G | |
| | 144G | (REC) | | | | | | | | | | | | | | |
| ON (the cooler switch 112 is ON) | 134G, 136R | (DEF) | G | G.R | G | G.R | G | G.R | | | | | | | G | G.R |
| | 128G, 130R | (VENT) | | | G | G.R | | | G | G.R | G | G.R | | | G | G.R |
| | 148G, 152R | (HEAT) | | | | | G | G.R | | | G | G.R | G | G.R | G | G.R |
| | 150G, 154R | (HEAT/R) | | | | | G | G.R | | | G | G.R | G | G.R | G | G.R |
| | 140G | (VENT/R) | G | G | G | G | G | G | G | G | G | G. | G | G | G | G |
| | 124G | (FRESH) | G | G | G | G | G | G | G | G | G | G | G | G | G | G |
| | 144G | (REC) | | | | | | | | | | | | | | |

Note
This TABLE 1 shows the relationship of the lighting condition among the lamps when the ignition key switch 174 connects with the ignition terminal IG.

Of course, the flicker circuit 168 may be replaced with the light-dimming circuit 176 shown in FIG. 14, the light-dimming circuit 176 and flicker circuit 168 used in combination, and the construction of the "HEAT" switch 166 changed by attaching variable slide resistors in this embodiment, as well. The connection to the ignition terminal IG may be changed to the accessory terminal ACC as shown by a dot-dash line in FIG. 16.

Figure 17:
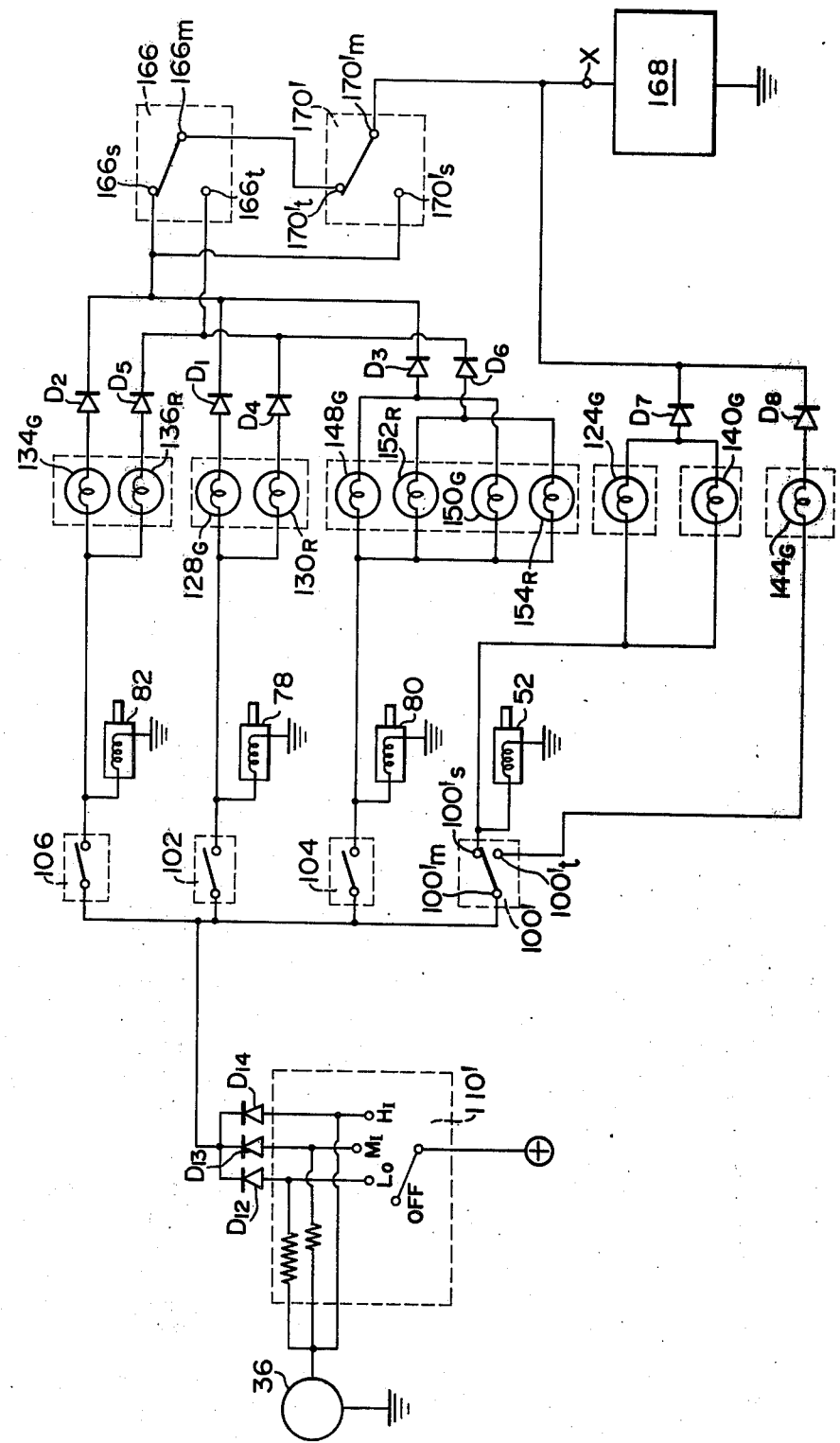
FIG. 17 is a circuit diagram showing the electrical makeup of a third embodiment of this invention.
Figure 19:
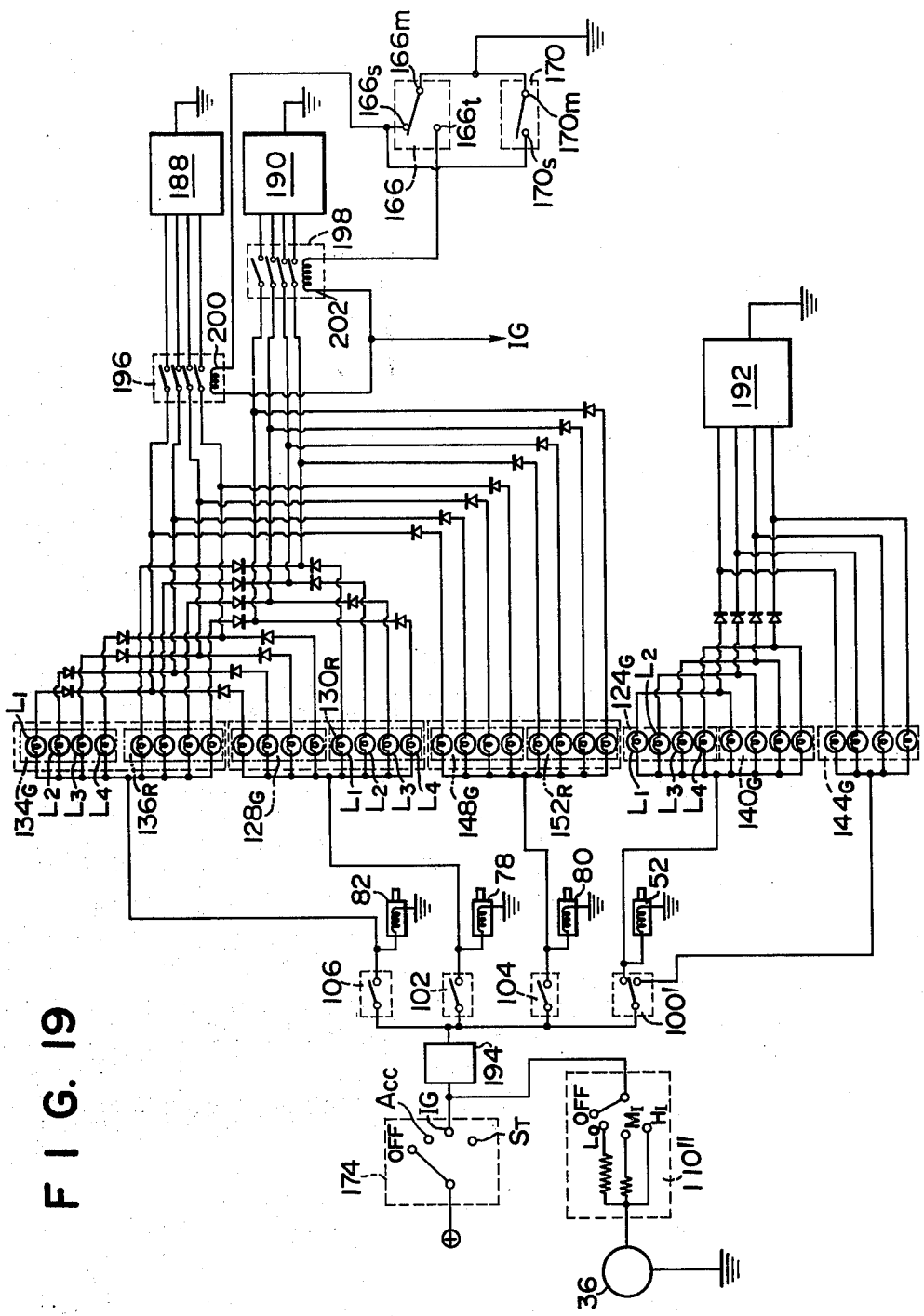
FIG. 19 is a circuit diagram showing the electrical make-up of a fifth embodiment of this invention.

Next, a third embodiment of this invention will be described by reference to FIG. 17. In this invention, a fan switch 110' having the same construction as the one shown in FIG. 15 and diodes D12, D13 and D14 are connected where the ignition key switch 174 is provided in the above described second embodiment, the cooler operation detecting switch is a change-over switch 170', the movable contact 166m of the "HEAT" switch 166 connects with one stationary contact 170't of said cooler operation detecting switch 170', and a movable contact 170'm of the cooler operation detecting switch 170' connects with the flicker circuit 168. The other stationary contact 170's of the cooler operation detecting switch 170' is connected in the same manner as the stationary contact 170s of the cooler operation detecting switch 170 of the above-described first embodiment.

With this arrangement, even if the temperature control lever 108 is in any other position than "OFF" and the movable contact 166m of the "HEAT" switch is connected with the contact 166t, no red lamp but only a green lamp corresponding to any of the push switches 100', 102, 104 and 106 that is closed lights, so long as the movable contact 170'm of the cooler operation detecting switch 170' is connected with the stationary contact 170's, or the cooler switch 110 is closed to put the cooler in operation. That is, the red lamps light only when the cooler is not in operation and the temperature control lever 108 is in any other position that "OFF." Unlike the above-described embodiments, both red and green lamps do not light at a time. Also, no lamp lights when the fan switch 110' is not connected to any of "LO" "MI" and "HI," and none of the damper valves of the air conditioner proper 10 corresponding to the push switches 100', 102, 104 and 106 operates. The relationship between the open-close condition of the switches and the on-off condition of the lamps is shown in Table 2 (in the same manner as in Table 1).

TABLE 2

REC (the movable contact 100'm connects with the contact 100't)

| Position of the cooler operation detecting switch 170 | lamp(s) | position of the temperature control lever 108 | DEF106 OFF | DEF106 NOT OFF | DEF106 VENT102 OFF | DEF106 VENT102 NOT OFF | DEF106 HEAT104 OFF | DEF106 HEAT104 NOT OFF | VENT102 OFF | VENT102 NOT OFF | VENT102 HEAT104 OFF | VENT102 HEAT104 NOT OFF | HEAT104 OFF | HEAT104 NOT OFF | DEF106 VENT102 HEAT104 OFF | DEF106 VENT102 HEAT104 NOT OFF |
|---|---|---|---|---|---|---|---|---|---|---|---|---|---|---|---|---|
| OFF (the cooler switch 112 is OFF) | 134G, 136R | (DEF) | G | R | G | R | G | R | | | | | | | G | R |
| | 128G, 130R | (VENT) | | | G | R | | | G | R | G | R | | | G | R |
| | 148G, 152R | (HEAT) | | | | | G | R | | | G | R | G | R | G | R |
| | 150G, 154R | (HEAT/R) | | | | | G | R | | | G | R | G | R | G | R |
| | 140G | (VENT/R) | | | | | | | | | | | | | | |
| | 124G | (FRESH) | | | | | | | | | | | | | | |
| | 144G | (REC) | G | G | G | G | G | G | G | G | G | G | G | G | G | G |
| ON (the cooler switch 112 is ON) | 134G, 136R | (DEF) | G | G | G | G | G | G | | | | | | | G | G |
| | 128G, 130R | (VENT) | | | G | G | | | G | G | G | G | | | G | G |
| | 148G, 152R | (HEAT) | | | | | G | G | | | G | G | G | G | G | G |
| | 150G, 154R | (HEAT/R) | | | | | G | G | | | G | G | G | G | G | G |
| | 140G | (VENT/R) | | | | | | | | | | | | | | |
| | 124G | (FRESH) | | | | | | | | | | | | | | |
| | 144G | (REC) | G | G | G | G | G | G | G | G | G | G | G | G | G | G |

FRESH (the movable contact 100'm connects with the contact 100's)

| Position of the cooler operation detecting switch 170 | lamp(s) | position of the temperature control lever 108 | DEF106 OFF | DEF106 NOT OFF | DEF106 VENT102 OFF | DEF106 VENT102 NOT OFF | DEF106 HEAT104 OFF | DEF106 HEAT104 NOT OFF | VENT102 OFF | VENT102 NOT OFF | VENT102 HEAT104 OFF | VENT102 HEAT104 NOT OFF | HEAT104 OFF | HEAT104 NOT OFF | DEF106 VENT102 HEAT104 OFF | DEF106 VENT102 HEAT104 NOT OFF |
|---|---|---|---|---|---|---|---|---|---|---|---|---|---|---|---|---|
| OFF (the cooler switch 112 is OFF) | 134G, 136R | (DEF) | G | R | G | R | G | R | | | | | | | G | R |
| | 128G, 130R | (VENT) | | | G | R | | | G | R | G | R | | | G | R |
| | 148G, 152R | (HEAT) | | | | | G | R | | | G | R | G | R | G | R |
| | 150G, 154R | (HEAT/R) | | | | | G | R | | | G | R | G | R | G | R |
| | 140G | (VENT/R) | G | G | G | G | G | G | G | G | G | G | G | G | G | G |
| | 124G | (FRESH) | G | G | G | G | G | G | G | G | G | G | G | G | G | G |
| | 144G | (REC) | | | | | | | | | | | | | | |
| ON (the cooler switch 112 is ON) | 134G, 136R | (DEF) | G | G | G | G | G | G | | | | | | | G | G |
| | 128G, 130R | (VENT) | | | G | G | | | G | G | G | G | | | G | G |
| | 148G, 152R | (HEAT) | | | | | G | G | | | G | G | G | G | G | G |
| | 150G, 154R | (HEAT/R) | | | | | G | G | | | G | G | G | G | G | G |
| | 140G | (VENT/R) | G | G | G | G | G | G | G | G | G | G | G | G | G | G |
| | 124G | (FRESH) | G | G | G | G | G | G | G | G | G | G | G | G | G | G |
| | 144G | (REC) | | | | | | | | | | | | | | |

Note:
This TABLE 2 shows the relationship of the lighting condition among the lamps when the fan switch 110' is connected to one of "LO," "MI" and "HI."

As in the above-described embodiments, the flicker circuit 168 may be replaced with the light-dimming circuit 176 shown in FIG. 14, the light-dimming circuit 176 and flicker circuit 168 used in combination, and the construction of the "HEAT" switch 166 modified to attach variable slide resistors in this embodiment, too.

Figure 16:
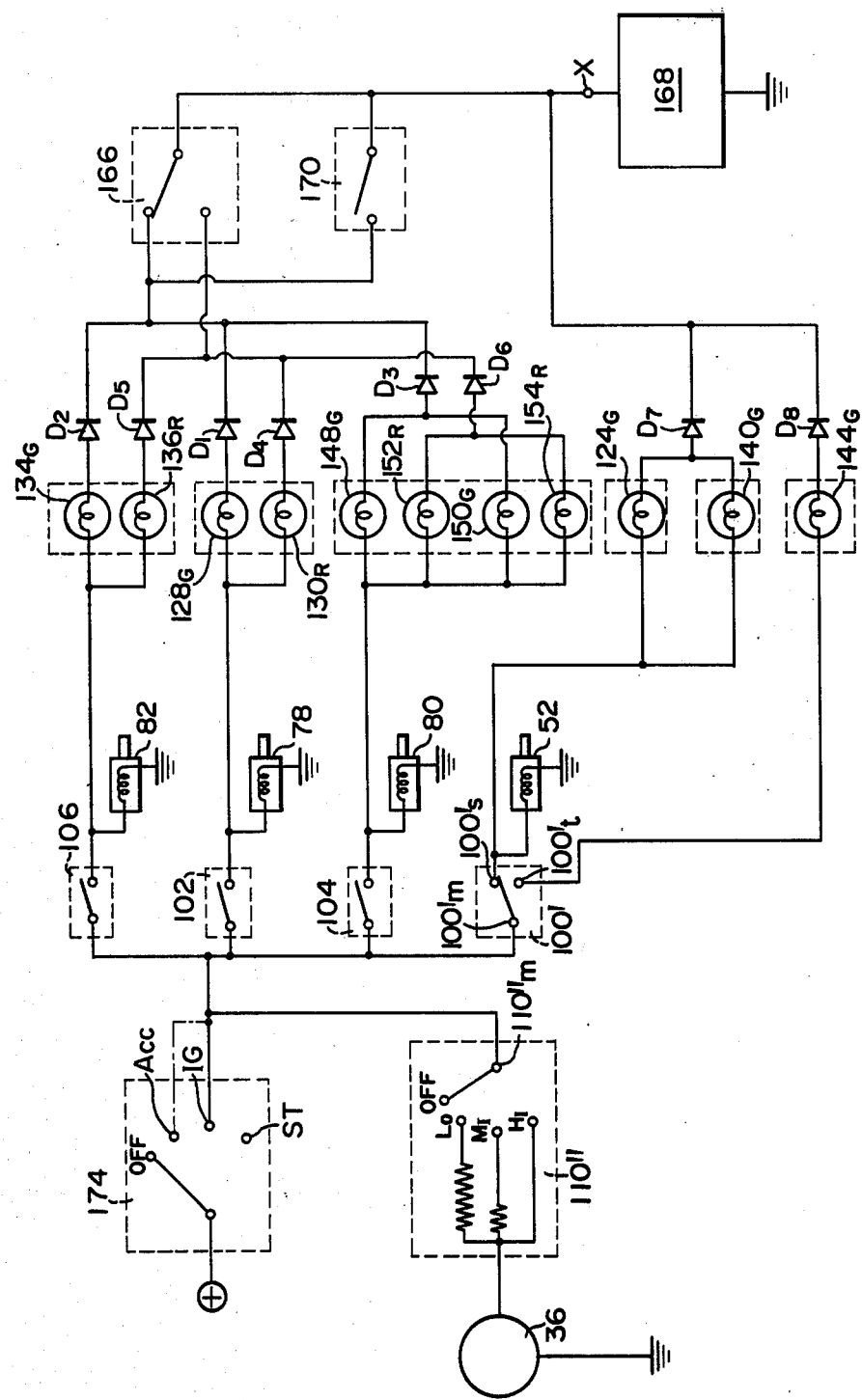
FIG. 16 is a circuit diagram showing the electrical make-up of a second embodiment of this invention.

The fan switch 110' of this embodiment may also be replaced with the ignition key switch 174 and fan switch 110" shown in FIG. 16. If connection of the ignition key switch 174 to the ignition terminal IG is regarded as equal to closing the fan switch 110' in FIG. 17, the switches open and close and the lamps turn on and off in the same manner as in the circuit of FIG. 17, as shown in Table 2.

Figure 18:
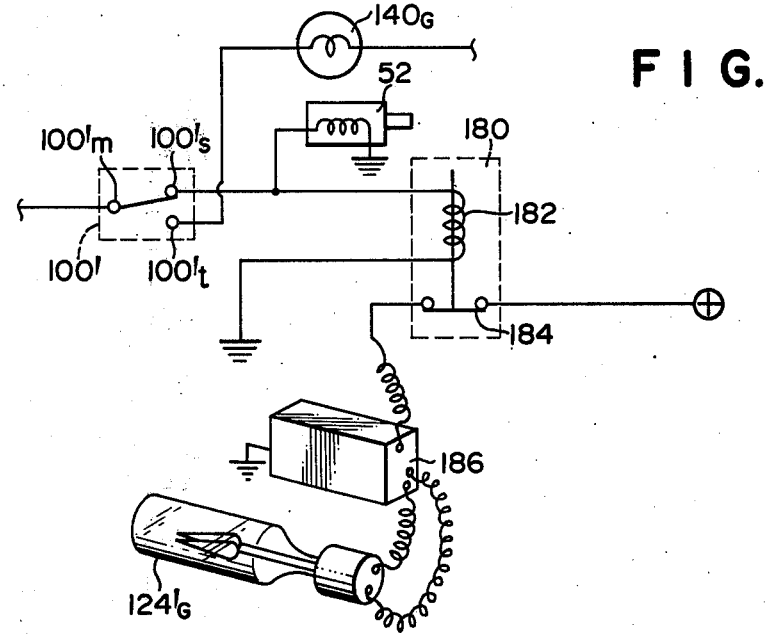
FIG. 18 is a schematic illustration of the principal portion of a fourth embodiment of this invention.

Now a fourth embodiment of this invention will be described by reference to FIG. 18. In this embodiment, the green lamp 124G, which is a mere electric bulb, connected to the change-over push switch 100 or 100' in the foregoing embodiments is replaced with a flicker cathode glow lamp 124'G. As shown in FIG. 18, an exciting coil 182 of a relay 180 connects with the stationary contact 100's of the change-over push switch 100' (or with the contact 100s of the change-over push switch 100) and an on-off relay contact 184 of said relay 180 is provided between the battery and an inverter (i.e., a D.C.-A.C. converter) 186. The inverter 186 connects with the flicker cathode glow lamp 124'G disposed, in place of the green lamp 124G, inside the partition 122 attached to the back plate 120 of the operating panel 96. When the movable contact 100'm of said change-over push switch 100' connects with the stationary contact 100's, the solenoid device 52 becomes energized to open the external air intake duct 14 of the air conditioner proper 10, and energizes the exciting coil 182 of said relay 180 to close the on-off relay contact 184. Thereupon, D.C. current is fed from the battery to the inverter 186, whence A.C. current flows to said flicker cathode glow lamp 124'G that thereupon lights with moving luminescent point. Accordingly, the light of the flicker cathode glow lamp 124'G passing through the arrow-shaped opening 118a in the shielding plate 118 indicates on the operating panel 96 that external air is being introduced from the external air intake duct 14 into the air conditioner proper 10, movingly shining just like the flow of air. In this embodiment, the flicker cathode glow lamp 124'G need not be connected with the flicker circuit 168. Therefore, if all lamps in the above-described first to third embodiments are replaced with the flicker cathode glow lamps, the flicker circuit 168 can be eliminated from their circuits.

A fifth embodiment of this invention will be described by reference to FIGS. 19 through 23. This embodiment comprises composing each of the lamps 128G through 154G, in the second embodiment shown in FIG. 16, of four lamps and giving air-flow like shining indications on the operating panel 96 by turning on and off the four lamps one after another by sequential circuits 188, 190 and 192. While the flicker circuit 168 is eliminated, a light-reducing circuit 194 is interposed between the ignition key switch 174 and the push switches 100', 102, 104 and 106. The green lamps 148G and 150G and the red lamps 152R and 154R light simultaneously when the "HEAT" push switch 104 closes. The green lamps 148G and 150G jointly comprise four lamps and are represented by reference character 148G, and the red lamps 152R and 154R jointly comprise four lamps and are represented by reference character 152R.

First lamps L1 of the green lamps 128G, 134G and 148G, each comprising four lamps, are connected with each other through diodes, and then to said sequential circuit 188 through one contact of a relay 196 having four on-off relay contacts. After being connected with each other through diodes, the remaining second lamps L2, third lamps L3 and fourth lamps L4 also are connected to said sequential circuit 188 through one contact of the relay 196. Like said green lamps, first to fourth lamps L1 through L4 of the red lamps 130R, 136R and 152R are connected with each other through diodes and then to the sequential circuit 190 through one contact of a relay 198 having four on-off relay contacts. Similarly, first to fourth lamps L1 through L4 of the green lamps 124G, 140G and 144G are connected with each other and then to the sequential circuit 192.

The relays 196 and 198 each have four interlocked on-off relay contacts for said first to fourth lamps, and said contacts close when exciting coils 200 and 202 are energized respectively. One end of the exciting coil 200 of the relay 196 is connected to the stationary contact 166s of the "HEAT" switch 166 and the stationary contact 170s of the cooler operation detecting switch 170, one end of the exciting coil 202 of the relay 198 to the stationary contact 166t of the "HEAT" switch 166, and the other ends of said exciting coils 200 and 202 are connected with each other and then to the ignition terminal IG of the ignition key switch 174.

Figure 21:
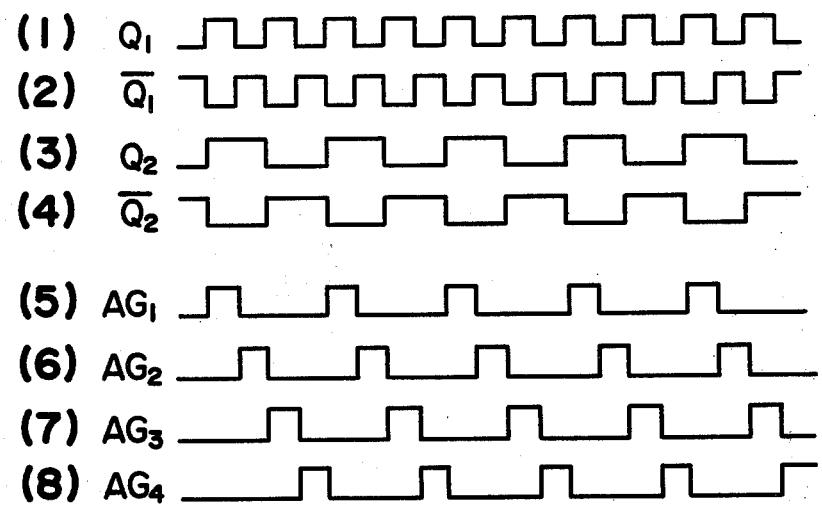
FIG. 21 is a graphical representation of time-wise changes in output signals of an oscillating circuit 204, a binary counter 206 and AND gates AG1 through AG4 in FIG. 20.
Figure 22:
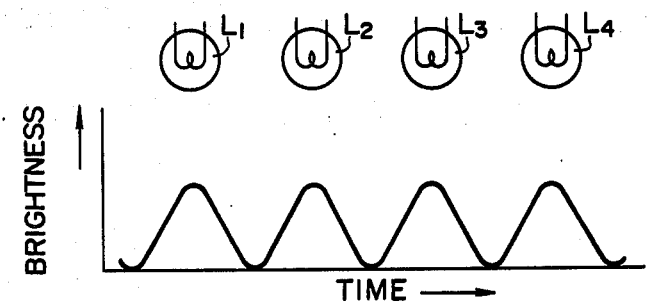
FIG. 22 is a graphical representation of the lighting condition of lamps L1 through L4.

The sequential circuits 188, 190 and 192 are all of the same type shown in FIG. 20, comprising an oscillation circuit 204 composed of NAND gates, capacitors, diodes and resistors, a binary counter 206, four AND gates AG1 through AG4, four resistors R14 through R17, and transistors Tr7 through Tr10. Said first through fourth lamps are connected to said transistors Tr7 through Tr10, respectively. On connecting the ignition key switch 174 to the ignition terminal IG, the oscillation circuit 204 alternatively generates Q output signal Q1 and $\overline{Q}$ output signal $\overline{Q1}$, as shown in FIG. 21-(1) and (2), respectively. The Q output signal Q1 is supplied to the binary counter 206 and also to the AND gates AG1 and AG3, while the $\overline{Q}$ output signal $\overline{Q1}$ to the AND gates AG2 and AG4. Intermittently fed with said Q output signal Q1, the binary counter 206 generates Q output signal Q2 and $\overline{Q}$ output signal $\overline{Q2}$ at the same time, as shown in FIG. 21-(3) and (4), respectively. The Q output signal Q2 is supplied to the AND gates AG1 and AG2, while the $\overline{Q}$ output signal $\overline{Q2}$ to the AND gates AG3 and AG4. When the Q output signals Q1 and Q2 and the $\overline{Q}$ output signals $\overline{Q1}$ and $\overline{Q2}$, shown in FIG. 21-(1), (2), (3) and (4), are supplied to the AND gates AG1 through AG4, the AND gates AG1 through AG4 each generate an output "H" as shown in FIG. 21-(5), (6), (7) and (8), and put the transistors Tr7 through Tr10 in conduction. Thereupon the lamp Li alone lights first, which is followed by the going off of the lamp L1 and lighting of the lamp L2 alone, and then the lamps L3 and L4, individually, in that order as shown in FIG. 22. The lamps L1 through L4 turn on and off successively, repeating said cycle. The first to fourth lamps L1 through L4, which make up each of the lamps 128G through 152R, are arranged inside the partition shown in FIG. 8 along the arrow-shaped opening shown in FIG. 7 so that the first to fourth lamps L1 through L4 successively turn on and off in the direction of the arrow. For example, in the case of the green lamp 124G provided inside the partition 122 behind the opening 118a, the lamp L1 is disposed above and the lamp L4 below, along said opening 118a. This gives an indication that looks like actual flow of air in the direction of the arrow. For the sequential circuits 188 and 190, the contacts of the relays 196 and 198 are interposed between the transistors Tr7 through Tr10 and the lamps L1 through L4 in FIG. 20.

The light-dimming circuit 194 comprises, as shown in FIG. 23, a relay L, an illumination lamp switch 178, a variable resistor Vr, resistors R18 and R19, and transistors Tr11 and Tr12, with a terminal Y thereof connected to said ignition terminal IG and a terminal Z to said push switches 100', 102, 104 and 106. When the illumination lamp switch 178 is open, the exciting coil of the relay L is not energized, and, therefore, a movable contact Lm thereof connects with a stationary contact Ls and current from the terminal Y flows through the contacts Ls and Lm to the terminal Z. When the illumination lamp switch 178 is closed, the exciting coil of the relay L is energized and the movable contact Lm connects with the stationary contact Lt. Thereupon, voltage divided by the variable resistor Vr is amplified by the transistors Tr11 and Tr12 to control the voltage on the emitter side of the transistor Tr12. When the controlled voltage is fed to the stationary contact Lt, the brightness of the lamps lit is reduced.

In the above-described fifth embodiment, all lamps are off when the ignition key switch 174 is not connected with the ignition terminal IG. When the connection to the ignition termial IG is made, a set of the four lamps, connected to one of the push switches 100', 102, 104 and 106 that is closed, turns on and off successively and repeatedly. As the first to fourth lamps, disposed behind the shielding plate 118 and along the arrow-shaped opening, turn on and off one after another, it can be easily perceived that air is flowing into or out of the air conditioner proper 10 in the direction in which the first to fourth lamps turn on and off. The relationship between the push switches and the four lamps is the same with that shown in Table 1 for the second embodiment shown in FIG. 16.

The sequential circuits 188, 190 and 192 of the above-described fifth embodiment each are composed of the AND gates AG1 through AG4 so that the four lamps L1 through L4 are successively and repeatedly turned on and off. By replacing the AND gates AG1 through AG4 with NAND gates NG1 through NG4, other components being unchanged, as shown in FIG. 24, for four lamps L1 through L4 can be so adapted as to light at a time when one of said push switches connected thereto is closed, and to go off one after another and repeatedly.

The push switches in the fifth embodiment, of course, may be connected to the fan switch or the car-speed detecting switch.

The push switches in the above-described embodiments, for actuating the solenoid devices and turning on and off the lamps, may be replaced with tumbler, pull or any other type of on-off and change-over switches. Also, the fan switch 110 and the cooler switch 112, which are push switches, may be replaced with rotary, tumbler or other suitable type of switches.

What is claimed is:

1. Automobile air-conditioning apparatus comprising an air conditioner, which comprises, at least, a plurality of air intake ducts, a plurality of air outlet ducts, and a plurality of damper valves to open and close said ducts and a fan device, an operating panel drawn with a sketch corresponding to the cabin of an automobile on which said air conditioner is mounted, display means disposed in positions in said sketch corresponding to the locations of said ducts and indicating the operating conditions of said ducts, means for controlling the operation of said air conditioner disposed in such positions on said operating panel corresponding to said display means, and operating means operated by said controlling means and actuating at least said damper valves provided in said ducts corresponding to said controlling means.

2. Automobile air-conditioning apparatus according to claim 1, wherein said operation controlling means comprise switches disposed in positions on said operating panel corresponding to said display means, and said operating means comprise electric operating means operated by said switches and actuate at least said damper valves provided in said ducts corresponding to said switches.

3. Automobile air-conditioning apparatus according to claim 1, which comprises display means disposed in positions in said sketch as correspond to said ducts and indicating whether or not said ducts are in operation by the turning on and off of lamps.

4. Automobile air-conditioning apparatus according to claim 3, wherein the turning on and off of said lamps are controlled by said switches.

5. Automobile air-conditioning apparatus according to claim 3, wherein letters designating the air flowing into and out of said air conditioner are written in positions on said sketch corresponding to said ducts.

6. Automobile air-conditioning apparatus according to claim 5, wherein the turning on and off of said lamps are controlled by said switches, and operating sections of said switches are disposed in the vicinity of said letters.

7. Automobile air-conditioning apparatus according to claim 1, wherein said sketch is a longitudinal cross-section of said automobile, and breaks are shown in positions of said sketch corresponding to said ducts.

8. Automobile air-conditioning apparatus according to claim 3, wherein directions of the air flowing into and out of said air conditioner are indicated by arrows in positions of said sketch corresponding to said ducts.

9. Automobile air-conditioning apparatus according to claim 8, wherein said sketch is a longitudinal cross-section of said automobile, breaks are shown in positions of said sketch corresponding to said ducts, letters designating the air flowing into and out of said air conditioner are written in the vicinity of said breaks, and at least one of said arrows is provided in such a way as to cross the break corresponding thereto.

10. Automobile air-conditioning apparatus according to claim 9, which comprises an operating panel comprising a transparent plate drawn with said sketch on which said breaks and letters are provided, a smoked panel disposed behind said transparent panel, a shielding plate disposed behind said smoked panel and provided with a plurality of arrow-shaped openings so as to give said arrow-shaped indications to cross said breaks, and a back panel attached with partitions to prevent intercommunication of spaces behind said plurality of arrow-shaped openigs and fitted with lamps, disposed in said spaces separated by said partitions, to emit light to give arrow-shaped indications on said transparent plate through said openings and smoked panel.

11. Automobile air-conditioning apparatus according to claim 10, wherein the turning on and off of said lamps are controlled by said switches, and operating portions of said switches are provided in the vicinity of said letters on said operating panel.

12. Automobile air-conditioning apparatus according to claim 1, wherein a fan switch to operate said fan device is provided in the vicinity of said sketch on said operating panel.

13. Automobile air-conditioning apparatus according to claim 1, wherein a heater core and a cooler core are provided in said air conditioner, and a temperature control lever regulating the flow rate of hot water fed to said heater core and a cooler switch to control the operation of a cooler device to supply refrigerant to said cooler core are provided in the vicinity of said sketch on said operating panel.

14. Automobile air-conditioning apparatus according to claim 8, wherein the flow of air from inside to outside of said automobile is indicated by an arrow when said air conditioner is operated so that external air is introduced therein.

15. Automobile air-conditioning apparatus according to claim 3, wherein lamps emitting a light of cold color are lit when cold air blows out from said outlet ducts and lamps emitting a light of warm color are lit when warm air blows out therefrom.

16. Automobile air-conditioning apparatus according to claim 11, which comprises an air conditioner comprising an external air intake duct to introduce external air, an internal air intake duct to introduce internal air in the cabin, a "DEF" outlet duct to blow out air into said cabin along the internal surface of the front glass thereof, a "VENT" outlet duct to blow out air against the upper half of the passenger's body, a "HEAT" outlet duct to blow out air toward the foot of the passenger, a change-over damper valve to switchingly open and close said intake ducts and damper valves disposed in said outlet ducts to open and close the outlet ducts, a first switch to control a first solenoid device to actuate said change-over damper valve, a first lamp connected to said first switch and lighting when said external air inlet duct is opened by the action of said change-over damper valve, a second lamp connected to said first switch and lighting when said internal air intake duct is opened by the action of said change-over damper valve, a second switch to control a second solenoid device that actuates the "DEF" damper valve disposed in said "DEF" outlet duct, a third lamp connected to said second switch and lighting when said "DEF" outlet duct is opened by the action of said "DEF" damper valve, a third switch to control a third solenoid device that actuates the "VENT" damper valve disposed in said "VENT" outlet duct, a fourth lamp connected to said third switch and lighting when said "VENT" outlet duct is opened by the action of said "VENT" damper valve, a fourth switch to control a fourth solenoid device that actuates the "HEAT" damper valve disposed in said "HEAT" outlet duct, and a fifth lamp connected to said fourth switch and lighting when said "HEAT" outlet duct is opened by the action of said "HEAT" damper valve.

17. Automobile air-conditioning apparatus according to claim 16, wherein said first and second lamps each are composed of a lamp emitting a light of cold color, and said third, fourth and fifth lamps each are composed of at least two lamps individually emitting lights of cold and warm colors.

18. Automobile air-conditioning apparatus according to claim 16, wherein said first and second lamps each are composed of a green lamp, and said third, fourth and fifth lamps each are composed of at least two lamps consisting of a green and a red lamp.

19. Automobile air-conditioning apparatus according to claim 2, wherein said switches are connected through the fan switch to operate said fan device to a power supply.

20. Automobile air-conditioning apparatus according to claim 19, wherein a car-speed detecting switch that closes when the car speed exceeds a given value is connected with said fan switch, in parallel, between said switches and power supply.

21. Automobile air-conditioning apparatus according to claim 2, wherein said switches are connected to the power supply through an ignition key switch to control the operation of the engine.

22. Automobile air-conditioning apparatus according to claim 3, wherein said lamps are connected with a flicker circuit whose output voltage changes with time so that said lamps, when lit, become brighter and darker repeatedly.

23. Automobile air-conditioning apparatus according to claim 3, wherein said lamps are connected with a light-dimming circuit that introduces high resistance when the illumination lamp switch is closed and low resistance when said illumination lamp switch is opened.

24. Automobile air-conditioning apparatus according to claim 16, wherein said first switch comprises two interlocked on-off switches that open and close conversely, one of said on-off switches is connected to said first lamp and first solenoid device and also to the power supply via a diode and said fan switch, the other of said on-off switches is connected to said second lamp and also to the power supply via said fan switch, and said second to fourth switches are connected through said diode and fan switch to the power supply.

25. Automobile air-conditioning apparatus according to claim 24, wherein a car-speed detecting switch that closes when the car speed exceeds a given value is connected to said fan switch and diode, in parallel, between said power supply and one of said on-off switches and secod to fourth switches.

26. Automobile air-conditioning apparatus according to claim 16, wherein said first switch is a change-over switch having a first contact connecting with said first lamp and first solenoid device and a second contact connecting with said second lamp, and said first switch and said second to fourth switches are connected to the power supply through an ignition key switch controlling the operation of the engine.

27. Automobile air-conditioning apparatus according to claim 17, which comprises a temperature control lever regulating the flow rate of hot water supplied to the heater core provided in said air conditioner and a heat switch having a first contact connecting with those lamps of said third to fifth lamps which emit a light of cold color and a second contact connecting with those lamps of said third to fifth lamps which emit a light of warm color, wherein said first contact is connected to the power supply when said temperature control lever lies in a position where hot water is not supplied substantially to said heat core and said second contact is connected to the power supply when said temperature control lever lies in a position where hot water is supplied substantially to said heater core.

28. Automobile air-conditioning apparatus according to claim 27, which comprises a cooler switch controlling the operation of the cooler device supplying refrigerant to the cooler core provided in said air conditioner and a cooler operation detecting switch interlocked with said cooler switch, connecting with those lamps of said third to fifth lamps which emit a light of cold color and closing on detecting the operation of said coller device.

29. Automobile air-conditioning apparatus according to claim 27, which comprises a cooler switch controlling the operation of the cooler device supplying refrigerant to the cooler core provided in said air conditioner and a cooler operation detecting switch interlocked with said cooler switch and having a first contact connecting with those lamps of said third to fifth lamps which emit a light of cold color and a second contact connecting with a movable contact to close a first and a second contact of said "HEAT" switch, wherein the first contact of said cooler operation detecting switch closes when said cooler switch closes and the second contact of said cooler operation detecting switch closes when said cooler switch opens.

30. Automobile air-conditioning apparatus according to claim 3, wherein at least one of said lamps is a flicker cathode glow lamp.

31. Automobile air-conditioning apparatus according to claim 10, wherein said lamp emitting light to give at least one of said arrow-shaped indications comprises a plurality of lamps connecting with a sequential circuit to cause said lamps to light on and off successively.

32. Automobile air-conditioning apparatus according to claim 31, wherein said plurality of lamps are lined along said arrow and connected with a sequential circuit causinst said lamps to turn on and off successively in the direction of said arrow.

33. Automobile air-conditioning apparatus according to claim 31, wherein said sequential circuit turns on one at a time of said plurality of lamps successively.

34. Automobile air-conditioning apparatus according to claim 31, wherein said sequential circuit turns off one at a time of said plurality of lamps successively.

* * * * *